(12) United States Patent
Laroche et al.

(10) Patent No.: US 10,057,592 B2
(45) Date of Patent: Aug. 21, 2018

(54) VIDEO ENCODING AND DECODING

(71) Applicant: CANON KABUSHIKI KAISHA, Tokyo (JP)

(72) Inventors: Guillaume Laroche, Melesse (FR); Patrice Onno, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 645 days.

(21) Appl. No.: 14/456,678

(22) Filed: Aug. 11, 2014

(65) Prior Publication Data

US 2015/0131729 A1    May 14, 2015

Related U.S. Application Data

(63) Continuation of application No. 14/003,564, filed as application No. PCT/EP2012/001041 on Mar. 8, 2012, now Pat. No. 8,824,555.

(30) Foreign Application Priority Data

Mar. 9, 2011  (GB) .................................. 1104033.4

(51) Int. Cl.
*H04N 7/12*      (2006.01)
*H04N 11/02*    (2006.01)
(Continued)

(52) U.S. Cl.
CPC .......... *H04N 19/503* (2014.11); *H04N 19/46* (2014.11); *H04N 19/52* (2014.11); *H04N 19/593* (2014.11)

(58) Field of Classification Search
None
See application file for complete search history.

(56) References Cited

U.S. PATENT DOCUMENTS

2004/0091048 A1    5/2004  Youn
2005/0053145 A1    3/2005  Hsu et al.
(Continued)

FOREIGN PATENT DOCUMENTS

CN    101156450 A    4/2008
CN    101271580 A    9/2008
(Continued)

OTHER PUBLICATIONS

Seungwook Park, Joonyoung Park, Byeongmoon Jeon, CE1 : Results on a selection of the representative motion data (A.3, A.7, A.9 and A.11), Joint Collaborative Team on Video Coding (JCT-VC) of ITU-T SG16 WP3 and ISO/IEC JTC1/SC29/WG11, 6th Meeting: Torino, IT, Jul. 14-22, 2011, Document: JCTVC-F112, Version 1, Jul. 1, 2011, pp. 1-6, 2011.
(Continued)

*Primary Examiner* — Talha M Nawaz
(74) *Attorney, Agent, or Firm* — Canon U.S.A., Inc. IP Division

(57) ABSTRACT

A temporal motion vector predictor is includable, together with one or more spatial motion vector predictors, in a set of motion vector predictors for a block to encode of a current frame. A method of determining the temporal motion vector predictor comprises selecting as the temporal predictor one motion vector from among motion vectors in a reference block of a reference frame different from the current frame. The reference block is a block of the reference frame collocated with the block to encode or a block of the reference frame neighboring the collocated block. The selection is based on a diversity criterion for achieving diversity among the predictors of the set.
This can reduce the motion vector memory requirements with no or no significant additional coding efficiency pen-
(Continued)

alty. Alternatively, even if the motion vector memory is not reduced in size, coding efficiency improvements can be achieved.

17 Claims, 13 Drawing Sheets

(51) Int. Cl.
    *H04N 11/04*          (2006.01)
    *H04N 19/503*        (2014.01)
    *H04N 19/593*        (2014.01)
    *H04N 19/52*          (2014.01)
    *H04N 19/46*          (2014.01)

(56) References Cited

U.S. PATENT DOCUMENTS

| | | | |
|---|---|---|---|
| 2007/0064797 | A1 | 3/2007 | Zhourong et al. |
| 2012/0134415 | A1* | 5/2012 | Lin ................... H04N 19/52 375/240.16 |
| 2013/0148737 | A1 | 6/2013 | Tourapis et al. |
| 2014/0153647 | A1* | 6/2014 | Nakamura ............ H04N 19/52 375/240.14 |
| 2014/0192883 | A1* | 7/2014 | Seregin ................. H04N 19/52 375/240.16 |
| 2015/0016527 | A1 | 1/2015 | Tourapis et al. |
| 2017/0150167 | A1* | 5/2017 | Nakamura ............ H04N 19/52 |
| 2017/0150168 | A1* | 5/2017 | Nakamura ............ H04N 19/52 |

FOREIGN PATENT DOCUMENTS

| | | |
|---|---|---|
| EP | 1528812 A1 | 5/2005 |
| EP | 2675168 A2 | 12/2013 |
| GB | 2488815 A | 12/2012 |
| RU | 2310231 C2 | 11/2007 |
| WO | 2009/115901 A2 | 9/2009 |

OTHER PUBLICATIONS

Kimihiko Kazui, Satoshi Shimada, Junpei Koyama, and Akira Nakagawa, Improvement on Deviation Process for Luma Motion Vector Prediction, Joint Collaborative Team on Video Coding (JCT-VC) of ITU-T SG16 WP3 and ISO/IEC JTC1/SC29/WG11, 6th Meeting: Torino, IT, Jul. 14-22, 2011, Document: JCTVC-F142, Version 1, Jul. 1, 2011, morning, pp. 1-7, 2011.
Kimihiko Kazui, Satoshi Shimada, Junpei Koyama, and Akira Nakagawa, Improvement on Deviation Process for Luma Motion Vector Prediction, Joint Collaborative Team on Video Coding (JCT-VC) of ITU-T SG16 WP3 and ISO/IEC JTC1/SC29/WG11, 6th Meeting: Torino, IT, Jul. 14-22, 2011, Document: JCTVC-F142, Version 3, Jul. 1, 2011, evening, pp. 1-7, 2011.
Guillaume Laroche, Patrice Onno, Tangi Poirier, Results about CE1 experiments related to A.1, A.5 and B.x tests, Joint Collaborative Team on Video Coding (JCT-VC) of ITU-T SG16 WP3 and ISO/IEC JTC1/SC29/WG11, 6th Meeting: Torino, IT, Jul. 14-22, 2011, Document: JCTVC-F278, Version 1, Jul. 1, 2011, pp. 1-15, 2011.
Guillaume Laroche, Patrice Onno, Tangi Poirier, Results about CE1 experiments related to A.1, A.5 and B.x tests, Joint Collaborative Team on Video Coding (JCT-VC) of ITU-T SG16 WP3 and ISO/IEC JTC1/SC29/WG11, 6th Meeting: Torino, IT, Jul. 14-22, 2011, Document: JCTVC-F278, Version 2, Jul. 11, 2011, pp. 1-15, 2011.
Kazushi Sato, CE1: Result of Test A2, Joint Collaborative Team on Video Coding (JCT-VC) of ITU-T SG16 WP3 and ISO/IEC JTC1/SC29/WG11, 6th Meeting: Torino, IT, Jul. 14-22, 2011, Document: JCTVC-F425, Version 1, Jul. 1, 2011, pp. 1-3, 2011.
Yi-Jen Chiu, Lidong Xu, Wenhao Zhang, Yu Han, CE1: Results of experiment A.4, Joint Collaborative Team on Video Coding (JCT-VC) of ITU-T SG16 WP3 and ISO/IEC JTC1/SC29/WG11, 6th Meeting: Torino, IT, Jul. 14-22, 2011, Document: JCTVC-F513, Version 1, Jul. 3, 2011, pp. 1-2, 2011.
Na Zhang, Xiaopeng Fan, Siwei Ma, Debin Zhao, CE9: Improvement in temporal candidate of merge mode and AMVP, Joint Collaborative Team on Video Coding (JCT-VC) of ITU-T SG16 WP3 and ISO/IEC JTC1/SC29/WG11, 7th Meeting: Geneva, CH, Nov. 21-30, 2011, Document: JCTVC-G343, Version 1, Nov. 8, 2011, pp. 1-17, 2011.
Na Zhang, Xiaopeng Fan, Siwei Ma, Debin Zhao, Non-CE9: Improvement in temporal candidate of merge mode and AMVP, Joint Collaborative Team on Video Coding (JCT-VC) of ITU-T SG16 WP3 and ISO/IEC JTC1/SC29/WG11, 7th Meeting: Geneva, CH, Nov. 21-30, 2011, Document: JCTVC-G343, Version 2, Nov. 10, 2011, pp. 1-17, 2011.
Na Zhang, Xiaopeng Fan, Siwei Ma, Debin Zhao, Non-CE9: Improvement in temporal candidate of merge mode and AMVP, Joint Collaborative Team on Video Coding (JCT-VC) of ITU-T SG16 WP3 and ISO/IEC JTC1/SC29/WG11, 7th Meeting: Geneva, CH, Nov. 21-30, 2011, Document: JCTVC-G343, Version 3, Nov. 20, 2011, pp. 1-18, 2011.
Na Zhang, Xiaopeng Fan, Siwei Ma, Debin Zhao, Non-CE9: Improvement in temporal candidate of merge mode and AMVP, Joint Collaborative Team on Video Coding (JCT-VC) of ITU-T SG16 WP3 and ISO/IEC JTC1/SC29/WG11, 7th Meeting: Geneva, CH, Nov. 21-30, 2011, Document: JCTVC-G343, Version 4, Nov. 22, 2011, pp. 1-19, 2011.
Bin Li, Jizheng Xu, Non-CE9: Improvement in temporal candidate of merge mode and AMVP (JCTVC-G343), Joint Collaborative Team on Video Coding (JCT-VC) of ITU-T SG16 WP3 and ISO/IEC JTC1/SC29/WG11, 7th Meeting: Geneva, CH, Nov. 21-30, 2011, Document: JCTVC-G406, Version 1, Nov. 9, 2011, pp. 1-2, 2011.
Yunfei Zheng, Wei-Jung Chien, Marta Karczewicz, Unified Motion Vector Predictor Selection for Merge and AMVP, Joint Collaborative Team on Video Coding (JCT-VC) of ITU-T SG16 WP3 and ISO/IEC JTC1/SC29/WG11, 5th Meeting: Geneva, Mar. 16-23, 2011, Document: JCTVC-E396, Version 1, Mar. 11, 2011, 5 pages, 2011.
Il-Koo Kim, Nikolay Shlyakhov, JeongHoon Park, Simplification of temporal motion vector (TMVP) candidate derivation for Merge and AMVP, Joint Collaborative Team on Video Coding (JCT-VC) of ITU-T SG16 WP3 and ISO/IEC JTC1/SC29/WG11, 7th Meeting: Geneva, CH, Nov. 21-30, 2011, Document: JCTVC-G552, Version 1, Nov. 8, 2011, pp. 1-5, 2011.
Yunfei Zheng, Wei-Jung Chien, Muhammed Coban, Marta Karczewicz, On Temporal Candidate of Merge and AMVP, Joint Collaborative Team on Video Coding (JCT-VC) of ITU-T SG16 WP3 and ISO/IEC JTC1/SC29/WG11, 5th Meeting: Geneva, Mar. 16-23, 2011, Document: JCTVC-E398, Mar. 11, 2011, 4 pages, 2011.
J. Jung, P. Onno, Description of Core Experiment CE1: Motion Data Storage Reduction, Joint Collaborative Team an Video Coding (JCT-VC) of ITU-T SG16 WP3 and ISO/IEC JTC1/SC29/WG11, 5th Meeting: Geneva, CH, Mar. 16-23, 2011, Document: JCTVC-E701, Version 1, Mar. 22, 2011, pp. 1-6, 2011.
J. Jung, P. Onno, Description of Core Experiment CE1: Motion Data Storage Reduction, Joint Collaborative Team an Video Coding (JCT-VC) of ITU-T SG16 WP3 and ISO/IEC JTC1/SC29/WG11, 5th Meeting: Geneva, CH, Mar. 16-23, 2011, Document: JCTVC-E701, Version 2, Mar. 23, 2011, pp. 1-6, 2011.
J. Jung, P. Onno, Y.W. Huang, Description of Core Experiment CE1: Motion Data Storage Reduction, Joint Collaborative Team on Video Coding (JCT-VC) of ITU-T SG16 WP3 and ISO/IEC JTC1/SC29/WG11, 5th Meeting: Geneva, CH, Mar. 16-23, 2011, Document: JCTVC-E701, Version 3, Apr. 15, 2011, pp. 1-8, 2011.
J. Jung, P. Onno, Y.W. Huang, CE1: Summary report of Core Experiment 1 on Motion Data Storage Reduction, Joint Collaborative Team on Video Coding (JCT-VC) of ITU-T SG16 WP3 and ISO/IEC JTC1/SC29/WG11, 6th Meeting: Torino, IT, Jul. 14-22, 2011, Document: JCTVC-F021, Version 1, Jul. 5, 2011, pp. 1-10, 2011.
J. Jung, P. Onno, Y.W. Huang, CE1: Summary report of Core Experiment 1 on Motion Data Storage Reduction, Joint Collabora-

(56) References Cited

OTHER PUBLICATIONS tive Team on Video Coding (JCT-VC) of ITU-T SG16 WP3 and ISO/IEC JTC1/SC29/WG11, 6th Meeting: Torino, IT, Jul. 14-22, 2011, Document: JCTVC-F021, Version 2, Jul. 14, 2011, pp. 1-11, 2011.

Yi-Wen Chen, Jian-Liang Lin, Xun Guo, Yu-Wen Huang, CE1: Results of Experiments A.6, A.8, and A.10, Joint Collaborative Team on Video Coding (JCT-VC) of ITU-T SG16 WP3 and ISO/IEC JTC1/SC29/WG11, 6th Meeting: Torino, IT, Jul. 14-22, 2011, Document: JCTVC-F064, Jul. 1, 2011, pp. 1-5, 2011.

Minhua Zhou, CE1: Evaluation results on A.09, A.13-16 and an alternative solution, Joint Collaborative Team on Video Coding (JCT-VC) of ITU-T SG16 WP3 and ISO/IEC JTC1/SC29/WG11, 6th Meeting: Torino, IT, Jul. 14-22, 2011, Document: JCTVC-F081, Version 1, Jul. 1, 2011, pp. 1-6, 2011.

Minhua Zhou, CE1: Evaluation results on A.09, A.13-16 and an alternative solution, Joint Collaborative Team on Video Coding (JCT-VC) of ITU-T SG16 WP3 and ISO/IEC JTC1/SC29/WG11, 6th Meeting: Torino, IT, Jul. 14-22, 2011, Document: JCTVC-F081, Version 2, Jul. 11, 2011, pp. 1-6, 2011.

Toshiyasu Sugio, Takahiro Nishi, Non-CE9: Modification of derivation process for the reference index for temporal merging candidate, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, Document: JCTVC-H0214, Version 1, Jan. 20, 2012, pp. 1-6, 2012.

Benjamin Bross, Woo-Jin Han, Jens-Rainer Ohm, Gary J. Sullivan, Thomas Wiegand, WD4: Working Draft 4 of High-Efficiency Video Coding, Joint Collaborative Team on Video Coding (JCT-VC) of ITU-T SG16 WP3 and ISO/IEC JTC1/SC29/WG11, 6th Meeting: Torino, IT, Jul. 14-22, 2011, Document: JCTVC-F803_d5, working draft, Nov. 9, 2011, pp. i-xii, 1-216, 2011.

Xun Guo, JianLiang Lin, Yu-Wen Huang, Shawmin Lei, Motion Vector Decimation for Temporal Prediction, Joint Collaborative Team on Video Coding (JCT-VC) of ITU-T SG16 WP3 and ISO/IEC JTC1/SC29/WG11, 5th Meeting: Geneva, CH, Mar. 16-23, 2011, Document JCTVC-E092, Version 1, Mar. 10, 2011, pp. 1-4, 2011.

Xun Guo, JianLiang Lin, Yu-Wen Huang, Shawmin Lei, Motion Vector Decimation for Temporal Prediction, Joint Collaborative Team on Video Coding (JCT-VC) of ITU-T SG16 WP3 and ISO/IEC JTC1/SC29/WG11, 5th Meeting: Geneva, CH, Mar. 16-23, 2011, Document JCTVC-E092, Version 2, Mar. 19, 2011, pp. 1-4, 2011.

Bin Li, Jizheng Xu, Feng Wu, Houqiang Li, On Motion Information Compression, Joint Collaborative Team on Video Coding (JCT-VC) of ITU-T SG16 WP3 and ISO/IEC JTC1/SC29/WG11, 5th Meeting: Geneva, CH, Mar. 16-23, 2011, Document JCTVC-E147, Version 1, Mar. 11, 2011, pp. 1-4, 2011.

Bin Li, Jizheng Xu, Feng Wu, Houqiang Li, On Motion Information Compression, Joint Collaborative Team on Video Coding (JCT-VC) of ITU-T SG16 WP3 and ISO/IEC JTC1/SC29/WG11, 5th Meeting: Geneva, CH, Mar. 16-23, 2011, Document JCTVC-E147, Version 2, Mar. 19, 2011, pp. 1-6, 2011.

Taichiro Shiodera, Akiyuki Tanizawa, Takeshi Chujoh, Tomoo Yamakage, Modified Motion Vector Memory Compression, Joint Collaborative Team on Video Coding (JCT-VC) of ITU-T SG16 WP3 and ISO/IEC JTC1/SC29/WG11, 5th Meeting: Geneva, CH, Mar. 16-23, 2011, Document JCTVC-E210 (sp? E211), Version 1, Mar. 11, 2011, pp. 1-6, 2011.

Taichiro Shiodera, Akiyuki Tanizawa, Takeshi Chujoh, Tomoo Yamakage, Modified Motion Vector Memory Compression, Joint Collaborative Team on Video Coding (JCT-VC) of ITU-T SG16 WP3 and ISO/IEC JTC1/SC29/WG11, 5th Meeting: Geneva, CH, Mar. 16-23, 2011, Document JCTVC-E211, Version 2, Mar. 16, 2011, afternoon, pp. 1-7, 2011.

Edouard Francois, Christophe Gisquet, Guillaume Laroche, Patrice Onno, Naël Ouedraogo, On Memory Compression for Motion Vector Prediction, Joint Collaborative Team on Video Coding (JCT-VC) of ITU-T SG16 WP3 and ISO/IEC JTC1/SC29/WG11, 5th Meeting: Geneva, CH, Mar. 16-23, 2011, Document JCTVC-E221, Version 1, Mar. 10, 2011, pp. 1-9, 2011.

Edouard Francois, Christophe Gisquet, Guillaume Laroche, Patrice Onno, Naël Ouedraogo, On Memory Compression for Motion Vector Prediction, Joint Collaborative Team on Video Coding (JCT-VC) of ITU-T SG16 WP3 and ISO/IEC JTC1/SC29/WG11, 5th Meeting: Geneva, CH, Mar. 16-23, 2011, Document JCTVC-E221, Version 2, Mar. 16, 2011, pp. 1-12, 2011.

Toshiyasu Sugio,Takahiro Nishi, Modified Motion Vector Compression Method, Joint Collaborative Team on Video Coding (JCT-VC) of ITU-T SG16 WP3 and ISO/IEC JTC1/SC29/WG11, 5th Meeting: Geneva, CH, Mar. 16-23, 2011 Document: JCTVC-E231, Version 1, Mar. 10, 2011, pp. 1-4, 2011.

Il-Koo Kim, Tammy Lee, Improved Motion Vector Decimation, Joint Collaborative Team on Video Coding (JCT-VC) of ITU-T SG16 WP3 and ISO/IEC JTC1/SC29/WG11, 5th Meeting: Geneva, CH, Mar. 16-23, 2011, Document: JCTVC-E307, Version 1, Mar. 11, 2011, pp. 1-2, 2011.

Il-Koo Kim, Tammy Lee, Improved Motion Vector Decimation, Joint Collaborative Team on Video Coding (JCT-VC) of ITU-T SG16 WP3 and ISO/IEC JTC1/SC29/WG11, 5th Meeting: Geneva, CH, Mar. 16-23, 2011, Document: JCTVC-E307, Version 2, Mar. 18, 2011, pp. 1-2, 2011.

Hiroya Nakamura, Shigeru Fukushima, Hideki Takehara, Non-CE9: Derivation process of reference indices for temporal merging candidates, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, Document: JCTVC-H0199, Version 1, Jan. 20, 2012, pp. 1-10, 2012.

* cited by examiner

| | | | | | |
|---|---|---|---|---|---|
| | TP6 | | | | |
| | TP5 | 6 | 8 | 14 | 16 |
| | TP4 | 5 | 7 | 13 | 15 |
| | TP3 | 2 | 4 | 10 | 12 |
| | TP2 | 1 | 3 | 9 | 11 |
| TP1 | LP1 | LP2 | LP3 | LP4 | LP5 |

Potential position of the top predictor

Potential position of the left predictor

Figure 12

| | | | |
|---|---|---|---|
| 5 | 5 | 5 | 7 |
| 5 | 5 | 5 | 7 |
| 6 | 6 | 6 | 8 |
| 8 | 8 | 8 | 10 |

Figure 13C

| | C | D | |
|---|---|---|---|
| 2 | 1 | 1 | 2 |
| 3 | 2 | 2 | 3 |
| 4 | 3 | 3 | 4 |
| 5 | 4 | 4 | 5 |

Figure 13B

| | | | |
|---|---|---|---|
| 3 | 2 | 1 | 2 |
| 4 | 3 | 2 | 3 |
| 5 | 4 | 3 | 4 |
| 6 | 5 | 4 | 5 |
| | | 1 | |

Figure 13A

VIDEO ENCODING AND DECODING

CROSS-REFERENCE TO RELATED APPLICATIONS

The application is a continuation of prior application Ser. No. 14/003,564, filed on Nov. 12, 2013 which was the National Stage of International Application No. PCT/EP2012/001041, filed on Mar. 8, 2012. This application claims the benefit under 35 U.S.C. § 119(a)-(d) of United Kingdom Patent Application No. 1104033.4, filed on Mar. 9, 2011. The U.S. application Ser. No. 14/003,564, International Application No. PCT/EP2012/001041, and United Kingdom Patent Application No. 1104033.4 are incorporated herein by reference in their entirety.

FIELD OF THE INVENTION

The invention relates to a method and device for encoding a sequence of digital images and a method and device for decoding a corresponding bitstream.

The invention belongs to the field of digital signal processing, and in particular to the field of video compression using motion compensation to reduce spatial and temporal redundancies in video streams.

DESCRIPTION OF THE PRIOR-ART

Many video compression formats, for example H.263, H.264, MPEG-1, MPEG-2, MPEG-4, SVC, use block-based discrete cosine transform (DCT) and motion compensation to remove spatial and temporal redundancies. They can be referred to as predictive video formats. Each frame or image of the video signal is divided into slices which are encoded and can be decoded independently. A slice is typically a rectangular portion of the frame, or more generally, a portion of a frame or an entire frame. Further, each slice is divided into macroblocks (MBs), and each macroblock is further divided into blocks, typically blocks of 8×8 pixels. In the more recent High Efficiency Video Coding (HEVC) currently in the course of standardization, each slice is divided into non-overlapping Largest Coding Units (LCUs), generally blocks of size 64 pixels×64 pixels. Each LCU may in turn be iteratively divided into smaller variable size Coding Units (CUs) using a quadtree decomposition. Each CU can be further partitioned into a maximum of 2 symmetric rectangular Partition Units. The encoded frames are of two types: temporal predicted frames (either predicted from one reference frame called P-frames or predicted from two reference frames called B-frames) and non temporal predicted frames (called Intra frames or I-frames).

Temporal prediction consists in finding in a reference frame, either a previous or a future frame of the video sequence, an image portion or reference area which is the closest to the block to encode. This step is known as motion estimation. Next, the difference between the block to encode and the reference portion is encoded (motion compensation), along with an item of motion information relative to the motion vector which indicates the reference area to use for motion compensation.

In order to further reduce the cost of encoding motion information, it has been proposed to encode a motion vector by difference from a motion vector predictor, typically computed from the motion vectors of the blocks surrounding the block to encode.

In H.264, motion vectors are encoded with respect to a median predictor computed from the motion vectors situated in a causal neighbourhood of the block to encode, for example from the blocks situated above and to the left of the block to encode. Only the difference, also called residual motion vector, between the median predictor and the current block motion vector is encoded.

The encoding using residual motion vectors saves some bitrate, but necessitates that the decoder performs the same computation of the motion vector predictor in order to decode the value of the motion vector of a block to decode.

Recently, further improvements have been proposed, such as using a plurality of possible motion vector predictors. This method, called motion vector competition, consists in determining between several motion vector predictors or candidates which motion vector predictor minimizes the encoding cost, typically a rate-distortion cost, of the residual motion information. The residual motion information comprises the residual motion vector, i.e. the difference between the actual motion vector of the block to encode and the selected motion vector predictor, and an item of information indicating the selected motion vector predictor, such as for example an encoded value of the index of the selected motion vector predictor.

In the High Efficiency Video Coding (HEVC) currently in the course of standardization, it has been proposed to select a first spatial motion vector predictor from a predetermined group of blocks above the current block to encode, and a second spatial motion vector predictor from another predetermined group of blocks to the left of the current block, and a temporal motion vector predictor from a collocated block in a reference frame. A collocated block is a block situated at the same position as the block to encode, but in another image. This motion vector predictor selection scheme is called Advanced Motion Vector Prediction (AMVP).

As a result of the motion vector predictor selection a set of motion vector predictor candidates mixing spatial predictors and temporal predictors is obtained, the set being made up of 0, 1, 2 or 3 candidates depending on the availability of the various spatial and temporal motion vector predictors. In order to reduce the overhead of signaling the motion vector predictor in the bitstream, the set of motion vector predictors is reduced by applying a suppression process eliminating the duplicated motion vectors, i.e. the motion vectors which have the same value. For example, if the first and second spatial motion vector predictors mentioned above are equal, only one of them, as well as the temporal motion vector predictor, should be kept as motion vector prediction candidates. In this case, only one bit is necessary to indicate the index of the motion vector predictor to the decoder.

The motion vector predictor candidates may also be ordered so as to position the most probable motion vector predictor in the first position, since minimal overhead occurs if the first candidate is chosen as the best predictor.

A sufficient reduction of the set of predictors leads to a gain in the signaling overhead, since the indication of the selected motion vector predictor can be encoded using fewer bits. At the limit, the set of candidates can be reduced to 1, for example if all motion vector predictors are equal, and therefore it is not necessary to insert any information relative to the selected motion vector predictor in the bitstream.

As described above, in the current HEVC proposal, motion vectors are coded by predictive coding, using a plurality of motion vector predictors which could be spatial or temporal predictors. Therefore, for each frame that is used as a reference frame for the derivation of the collocated motion vector predictor, it is necessary to store at the encoder and decoder sides its related motion vectors. By default, the size of the motion vector memory is significant, considering first the granularity of motion representation (in the current HEVC design, the minimum Inter block size is 4×4) and secondly that there are up to two vectors per motion block for a B_SLICE. It is estimated that for 4K×2K resolution pictures, and using a granularity of one set of motion vectors per block of 4×4 pixels 26 Mbits are required per frame.

Yeping Su and Andrew Segall, "On motion vector competition", JCTVC-C257, Guangzhou, CN, 7-15 Oct., 2010, and Yeping Su and Andrew Segall, "CE9: Reduced resolution storage of motion vector data", JCTVC-D072, Daegu, KR, 20-28 Jan., 2011, proposes to reduce the size of the motion vector memory needed on the decoder side for storing temporal collocated vectors and reference indices. The proposed solution consists of a simple block-wise summarization of the motion vectors as illustrated in FIG. 1. In the current HEVC implementation, one motion vector out of 16 is kept in each square of 64×64 pixels, and the motion vector of the top left 4×4 block is considered. This reduces the memory requirements by a factor of 16. This reduction factor is signaled in the sequence parameter set. The motion vector memory compression process is performed after the adaptive loop filter process, and before the decoded picture is put into decoded picture buffer (DPB).

This solution enables a significant reduction of the motion vector memory, with a coding efficiency penalty. However, this solution does not consider the diversity of the predictors in the set for the block summarization in the MV memory compression. Moreover, several criteria were tested but without considering the diversity. Furthermore, this solution is neither adaptive nor flexible. In addition, when more compression is required, a higher reduction ratio in the motion vectors removal is necessary, which can lead to significant coding efficiency loss.

WO 2004/012459A describes another proposal for limiting the number of stored motion vectors. Limitation information is coded as header information (possibly at a global level such as SPS, picture level such as PPS or slice level such as slice header). This limitation information indicates the number of pictures or the number of macroblocks for which motion vectors are stored. If a coded block refers to a motion vector that is stored, then this motion vector is used, otherwise a null motion vector (both components are equal to 0) is used. However, this solution does not consider block summarization.

Apart from proposals to reduce the motion vector storage requirements, other prior proposals have sought improvements in the predictors for AMVP.

For example, Jung, G. Clare, (Orange Labs), "Temporal MV predictor modification for MV-Comp, Skip, Direct and Merge schemes", JCTVC-D164, Daegu, KR, 20-28 Jan., 2011, proposes using a centered temporal predictor, see also WO 2011/001077 A. In this proposal the collocated block is found by mapping the centre of the block to a collocated reference frame, instead of the origin (top left) of the block (as the previous version of HEVC). The centre and the top left motion vectors have the same value if the collocated block has the same size or a higher size than the current block. FIG. 2 shows a collocated block sub-divided into 64 4×4 blocks, each having its own motion vector. This collocated block is used for a 32×32 current block to encode and the selected temporal predictor is the motion vector of the shaded 4×4 block at the centre of the collocated block.

The aim of selecting the centre of the partition instead of the top left is to find a better representation of the motion of the collocated block. Theoretically, the centre of the block is a better representation of the block because it is the barycentre of the block. But the temporal predictor from the collocated block is not the only predictor in the set of AMVP predictors.

Jian-Liang Lin, Yu-Pao Tsai, Yu-Wen Huang, Shawmin Lei, (MediaTek Inc.), "Improved Advanced Motion Vector Prediction", JCTVC-D125, Daegu, KR, 20-28 Jan., 2011, proposes to add several temporal blocks as depicted in FIG. 3. 4 predictors are proposed, the temporal collocated top left (T) and three other corners (bottom left (I), bottom right (H), top right (E)). In this way, predictors are added to the predictors set and they compete with one another according to the rate-distortion criterion.

Neither of the above two proposals for improving the motion vector predictors set involves compressing the motion vector memory.

It is desirable to address one or more of the prior art drawbacks.

It is also desirable to reduce the motion vector memory requirements. Preferably this reduction should be achieved with no or no significant additional coding efficiency penalty. Still more preferably this reduction should be achieved in combination with coding efficiency improvements.

It is also desirable to achieve coding efficiency improvements. Preferably these improvements should be achieved with no or no significant motion vector memory requirement penalty. Still more preferably these improvements should be achieved in combination with reductions in the motion vector memory requirements.

It is also desirable to find good representative motion vectors in a reference frame to use as predictors, however those representative motion vectors are used, i.e. even if they are used for purposes other than reducing the motion vector memory requirement and/or improving coding efficiency.

SUMMARY OF THE INVENTION

According to a first aspect of the present invention there is provided a method of determining a temporal motion vector predictor includable, together with one or more spatial motion vector predictors, in a set of motion vector predictors for a block to encode of a current frame, the method comprising selecting as said temporal predictor one motion vector from among motion vectors in a reference block of a reference frame different from said current frame, the reference block being a block of the reference frame collocated with said block to encode or a block of the reference frame neighboring the collocated block, and the selection being based on a diversity criterion for achieving diversity among the predictors of said set.

Such a method can be used to find the best motion vector for the block-wise vector summarization during the memory compression process. The selection of the best predictor may be based on a spatial and/or spatio-temporal distance between the predictor's positions which could be used for the prediction of the current motion vector or for the predictor of the Merge and Skip modes.

In one embodiment a motion vector position is selected among a set of positions which, in terms of spatial distance, the farthest position compared to the positions of the other predictors. Moreover, the positions considered should be a good representation of the neighboring blocks or of the collocated block. In this way it is possible to obtain diversity in the predictors set.

According to a second aspect of the present invention there is provided a method of determining a temporal motion vector predictor includable, together with one or more spatial motion vector predictors, in a set of motion vector predictors for a block to encode of a current frame, the method comprising selecting as said temporal predictor the motion vector at a bottom right position of a block of the reference frame collocated with said block to encode.

Such a selection works well with relatively small block sizes and has the advantage of having no processing burden because the selection is predetermined.

According to a third aspect of the present invention there is provided a method of determining a temporal motion vector predictor includable, together with one or more spatial motion vector predictors, in a set of motion vector predictors for a block to encode of a current frame, the method comprising selecting as said temporal predictor the motion vector at a bottom right position of a block of the reference frame collocated with said block to encode or at a predetermined position, in the vicinity of said bottom right position, in a block of the reference frame neighboring the collocated block.

In this aspect of the invention the selection is expanded to include positions in the vicinity of said bottom right position, in a block of the reference frame neighboring the collocated block.

Such a selection works also well with relatively small block sizes and has the advantage of having no processing burden because the selection is predetermined.

According to a fourth aspect of the present invention there is provided a method of determining a temporal motion vector predictor includable, together with one or more spatial motion vector predictors, in a set of motion vector predictors for a block to encode of a current frame, the method comprising selecting as said temporal predictor one motion vector from among motion vectors in a reference block of a reference frame different from said current frame, the reference block being a block of the reference frame collocated with said block to encode or a block of the reference frame neighboring the collocated block, and the selection being dependent on a block size of the block to encode.

Such a method enables the motion vector to be selected differently for different block sizes. In experiments, good results were achieved with this method.

For example, in the case of a first block size the motion vector at a first predetermined position in the reference block may be selected as said temporal predictor and in the case of a second block size different from the first block size the motion vector at a second predetermined position in the reference block, different from the first position, may be selected as said temporal predictor. When the first block size is smaller than the second block size, it is effective to make the first position a bottom right position in the collocated block and to make the second position a central position in the collocated block.

Alternatively, in the case of a first block size one motion vector in the reference block may be selected as said temporal predictor using a first selection method and in the case of a second block size different from the first block size one motion vector in the reference block may be selected using a second selection method different from said first method.

Some embodiments involve determining relative positions of at least one said spatial predictor and at least one motion vector of said reference block, and selecting said temporal predictor in dependence upon said relative positions. This is an effective way to ensure controlled diversity between the predictors.

Other embodiments involve determining availability of at least one said spatial predictor, and selecting said temporal predictor in dependence upon said availability. Again, this is an effective way to ensure controlled diversity. For example, in some implementations one or more spatial predictors may be excluded. Also for some positions in the frame, e.g. the top of the frame or the left hand edge of the frame, it is known in advance that one or more spatial predictors are unavailable.

Another embodiment uses a lookup table to select said temporal predictor, said lookup table storing for one or more different selectable combinations of spatial predictors information identifying the motion vector of the reference block to select for the combination concerned. This has a low complexity and can work fast.

The methods of the first to fourth aspects can be used to achieve a reduction in the memory requirement for storing motion vectors. They can also be used to improve the coding efficiency.

In the memory reduction case, the temporal predictor is selected before at least one spatial predictor is selected. Accordingly, in this case, the methods may further comprise estimating the position of the spatial predictor concerned in dependence upon an average position among the potential positions of the spatial predictor concerned. The average can be weighted, if desired, according to the relative frequencies at which the potential positions will be selected. This in turn depends on the selection process applied, e.g. in AMVP a search is carried out from right to left for the top predictor and from bottom to top for the left predictor. This affects the relative frequencies.

According to a fifth aspect of the present invention there is provided a method of storing motion vectors to be used as temporal motion vector predictors, comprising storing, from among motion vectors of the block to be encoded of a current frame, the motion vector having the same position as the temporal predictor determined by the method of any one of the first to fourth aspects of the present invention so that the stored motion vector is available as a temporal predictor for the encoding of a further frame with reference to said current frame, and not storing other said motion vectors of the block to be encoded of the current frame.

This improves the coding efficiency compared to prior block summarization methods.

According to a sixth aspect of the present invention there is provided a method of generating a set of motion vector predictors for a block to encode of a current frame, the set being permitted to include at least one spatial motion vector predictor and at least one temporal motion vector predictor, comprising using the method of any one of the first to fourth aspects of the present invention to determine the or one said temporal motion vector predictor of the set.

This can provide coding efficiency improvements. In this aspect of the invention it is possible to store all the motion vectors, i.e. it is not necessary to reduce the number of motion vectors stored, although this is of course preferable.

In this case, at least one said spatial predictor is selected before the temporal predictor is determined, and the determination of the temporal predictor is preferably carried out in dependence upon the selected spatial predictor(s). Unlike in the memory reduction application, therefore, the actual outcomes of the spatial predictor selections can be taken into account, which gives good results in terms of improving diversity.

According to a seventh aspect of the present invention there is provided a method of encoding a sequence of digital images into a bitstream, at least one portion of an image being encoded by motion compensation with respect to a reference image portion, comprising the method of determining a temporal motion vector predictor according to any of the first to fourth aspects of the present invention.

According to an eighth aspect of the present invention there is provided a method of encoding a sequence of digital images into a bitstream, at least one portion of an image being encoded by motion compensation with respect to a reference image portion, comprising the method of storing motion vectors according to the fifth aspect of the present invention.

According to a ninth aspect of the present invention there is provided a method of encoding a sequence of digital images into a bitstream, at least one portion of an image being encoded by motion compensation with respect to a reference image portion, comprising the method of generating a set of motion vector predictors according to the sixth aspect of the present invention.

In tenth to fifteenth aspects of the present invention the methods of the first to sixth aspects can also be used in a method of decoding a bitstream comprising an encoded sequence of digital images, at least one portion of an image being encoded by motion compensation with respect to a reference image.

According to a sixteenth aspect of the present invention there is provided apparatus for determining a temporal motion vector predictor includable, together with one or more spatial motion vector predictors, in a set of motion vector predictors for a block to encode of a current frame, the apparatus comprising means for selecting as said temporal predictor one motion vector from among motion vectors in a reference block of a reference frame different from said current frame, the reference block being a block of the reference frame collocated with said block to encode or a block of the reference frame neighboring the collocated block, and the selection being based on a diversity criterion for achieving diversity among the predictors of said set.

According to a seventeenth aspect of the present invention there is provided apparatus for determining a temporal motion vector predictor includable, together with one or more spatial motion vector predictors, in a set of motion vector predictors for a block to encode of a current frame, the apparatus comprising means for selecting as said temporal predictor the motion vector at a bottom right position of a block of the reference frame collocated with said block to encode.

According to an eighteenth aspect of the present invention there is provided apparatus for determining a temporal motion vector predictor includable, together with one or more spatial motion vector predictors, in a set of motion vector predictors for a block to encode of a current frame, the apparatus comprising means for selecting as said temporal predictor the motion vector at a bottom right position of a block of the reference frame collocated with said block to encode or at a predetermined position, in the vicinity of said bottom right position, in a block of the reference frame neighboring the collocated block.

According to a nineteenth aspect of the present invention there is provided apparatus for determining a temporal motion vector predictor includable, together with one or more spatial motion vector predictors, in a set of motion vector predictors for a block to encode of a current frame, the apparatus comprising means for selecting as said temporal predictor one motion vector from among motion vectors in a reference block of a reference frame different from said current frame, the reference block being a block of the reference frame collocated with said block to encode or a block of the reference frame neighboring the collocated block, and the selection being dependent on a block size of the block to encode.

According to a twentieth aspect of the present invention there is provided apparatus for storing motion vectors to be used as temporal motion vector predictors, comprising control means for causing storage, from among motion vectors of the block to be encoded of a current frame, of the motion vector having the same position as the temporal predictor determined by the apparatus of any of the sixteenth to nineteenth aspects of the present invention so that the stored motion vector is available as a temporal predictor for the encoding of a further frame with reference to said current frame, and for preventing storage of other said motion vectors of the block to be encoded of the current frame.

According to a twenty-first aspect of the present invention there is provided apparatus for generating a set of motion vector predictors for a block to encode of a current frame, the set being permitted to include at least one spatial motion vector predictor and at least one temporal motion vector predictor, comprising the apparatus of any one of the sixteenth to nineteenth aspects for determining the or one said temporal motion vector predictor of the set.

According to a twenty-second aspect of the present invention there are provided apparatus for encoding a sequence of digital images into a bitstream, at least one portion of an image being encoded by motion compensation with respect to a reference image portion, comprising the apparatus of any one of the sixteenth to nineteenth aspects for determining a temporal motion vector predictor.

According to a twenty-third aspect of the present invention there is provided apparatus for encoding a sequence of digital images into a bitstream, at least one portion of an image being encoded by motion compensation with respect to a reference image portion, comprising the apparatus for storing motion vectors of the twentieth aspect of the present invention.

According to a twenty-fourth aspect of the present invention there is provided apparatus for encoding a sequence of digital images into a bitstream, at least one portion of an image being encoded by motion compensation with respect to a reference image portion, comprising the apparatus for generating a set of motion vector predictors of the twenty-first aspect of the present invention.

According to a twenty-fifth aspect of the present invention there is provided apparatus for decoding a bitstream comprising an encoded sequence of digital images, at least one portion of an image being encoded by motion compensation with respect to a reference image, comprising the apparatus of any one of sixteenth to nineteenth aspects for determining a temporal motion vector predictor.

According to a twenty-sixth aspect of the present invention there is provided apparatus for decoding a bitstream comprising an encoded sequence of digital images, at least one portion of an image being encoded by motion compensation with respect to a reference image, comprising the apparatus for storing motion vectors of the twentieth aspect of the present invention.

According to a twenty-seventh aspect of the present invention there is provided apparatus for decoding a bitstream comprising an encoded sequence of digital images, at least one portion of an image being encoded by motion compensation with respect to a reference image, comprising the apparatus for generating a set of motion vector predictors of the twenty-first aspect of the present invention.

The present invention also extends to programs which, when run on a computer or processor, cause the computer or processor to carry out any of the methods described above or which, when loaded into a programmable apparatus, cause that apparatus to become any of the apparatuses described above. The program may be provided by itself, or carried by a carrier medium. The carrier medium may be a storage or recording medium, or it may be a transmission medium such as a signal. A program embodying the present invention may be transitory or non-transitory.

As described above, in embodiments of the present invention the positions of the spatial predictors are taken into account to produce diversity in the predictors set, instead of using the best representation of the predictors set.

For MV memory compression, significant results are obtained compared to other proposals. Also there is no impact on computational complexity compared to the prior art.

The invention can also be used for the motion vector derivation process in order to create diversity in the predictors set.

The invention can also be used to increase the coding efficiency of the motion vector memory compression. More precisely, in this case it is possible to reduce the loss (in terms of coding efficiency) generated by the block summarization of the motion vector memory compression or to increase the compression ratio (of the motion vector memory compression) with a coding efficiency similar to the classical block summarization.

By extension, the embodiments of the invention can improve the coding efficiency of the AMVP scheme and of the Merge mode.

BRIEF DESCRIPTION OF THE DRAWINGS

Reference will now be made, by way of example, to the accompanying drawings in which:

FIG. 12 is a schematic diagram for use in explaining a principle underlying the method of FIG. 11; and FIGS. 13A to 13C show respective distance matrices suitable for use in the method of FIG. 11.

DETAILED DESCRIPTION OF THE EMBODIMENTS

Figure 4:
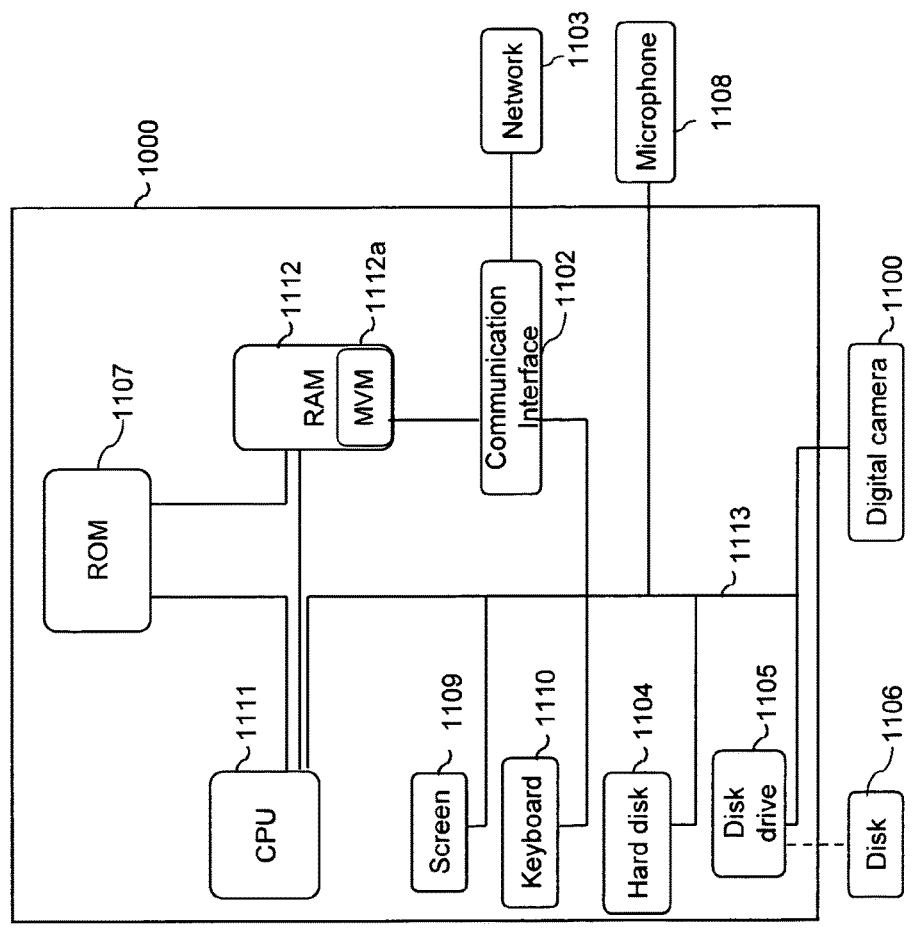
FIG. 4 shows parts of apparatus suitable for implementing an encoder or a decoder according to an embodiment of the present invention.

FIG. 4 illustrates a diagram of apparatus 1000 adapted to implement an encoder according to an embodiment of the present invention or to implement a decoder according to an embodiment of the present invention. The apparatus 1000 is for example a micro-computer, a workstation or a light portable device.

The apparatus 1000 comprises a communication bus 1113 to which there are preferably connected:
  a central processing unit 1111, such as a microprocessor, denoted CPU;
  a read only memory (ROM) 1107 which stores one or more computer programs for implementing the invention;
  a random access memory (RAM) 1112 which stores executable code of the method of the invention and provides registers adapted to record variables and parameters necessary for implementing the method of encoding a sequence of digital images and/or the method of decoding a bitstream; and
  a communication interface 1102 connected to a communication network 1103 over which digital data to be processed are transmitted.

A motion vector memory (MVM) 1112a forms part of the RAM 1112 and is used for storing motion vectors of reference frames.

Optionally, the apparatus 1000 may also have the following components:
  a data storage means 1104 such as a hard disk, able to contain the programs implementing the invention and data used or produced during the implementation of the invention;
  a disk drive 1105 for a disk 1106, the disk drive being adapted to read data from the disk 1106 or to write data onto said disk;
  a screen 1109 for displaying data and/or serving as a graphical interface with the user, by means of a keyboard 1110 or any other pointing means.

The apparatus 1000 can be connected to various peripherals, such as for example a digital camera 1100 or a microphone 1108, each being connected to an input/output card (not shown) so as to supply multimedia data to the apparatus 1000.

The communication bus affords communication and interoperability between the various elements included in the apparatus 1000 or connected to it. The representation of the bus is not limiting and in particular the central processing unit is able to communicate instructions to any element of the apparatus 1000 directly or by means of another element of the apparatus 1000.

The disk 1106 can be replaced by any information medium such as for example a compact disk (CD-ROM), rewritable or not, a ZIP disk or a memory card and, in general terms, by an information storage means that can be read by a microcomputer or by a microprocessor, integrated or not into the apparatus, possibly removable and adapted to store one or more programs whose execution enables the method of encoding a sequence of digital images and/or the method of decoding a bitstream according to the invention to be implemented.

The executable code may be stored either in read only memory 1107, on the hard disk 1104 or on a removable digital medium such as for example a disk 1106 as described previously. According to a variant, the executable code of the programs can be received by means of the communication network 1103, via the interface 1102, in order to be stored in one of the storage means of the apparatus 1000 before being executed, such as the hard disk 1104.

The central processing unit 1111 is adapted to control and direct the execution of the instructions or portions of software code of the program or programs according to the invention, instructions that are stored in one of the aforementioned storage means. On powering up, the program or programs that are stored in a non-volatile memory, for example on the hard disk 1104 or in the read only memory 1107, are transferred into the random access memory 1112, which then contains the executable code of the program or programs, as well as registers for storing the variables and parameters necessary for implementing the invention.

In this embodiment, the apparatus is a programmable apparatus which uses software to implement the invention. However, alternatively, the present invention may be implemented in hardware (for example, in the form of an Application Specific Integrated Circuit or ASIC).

Figure 5:
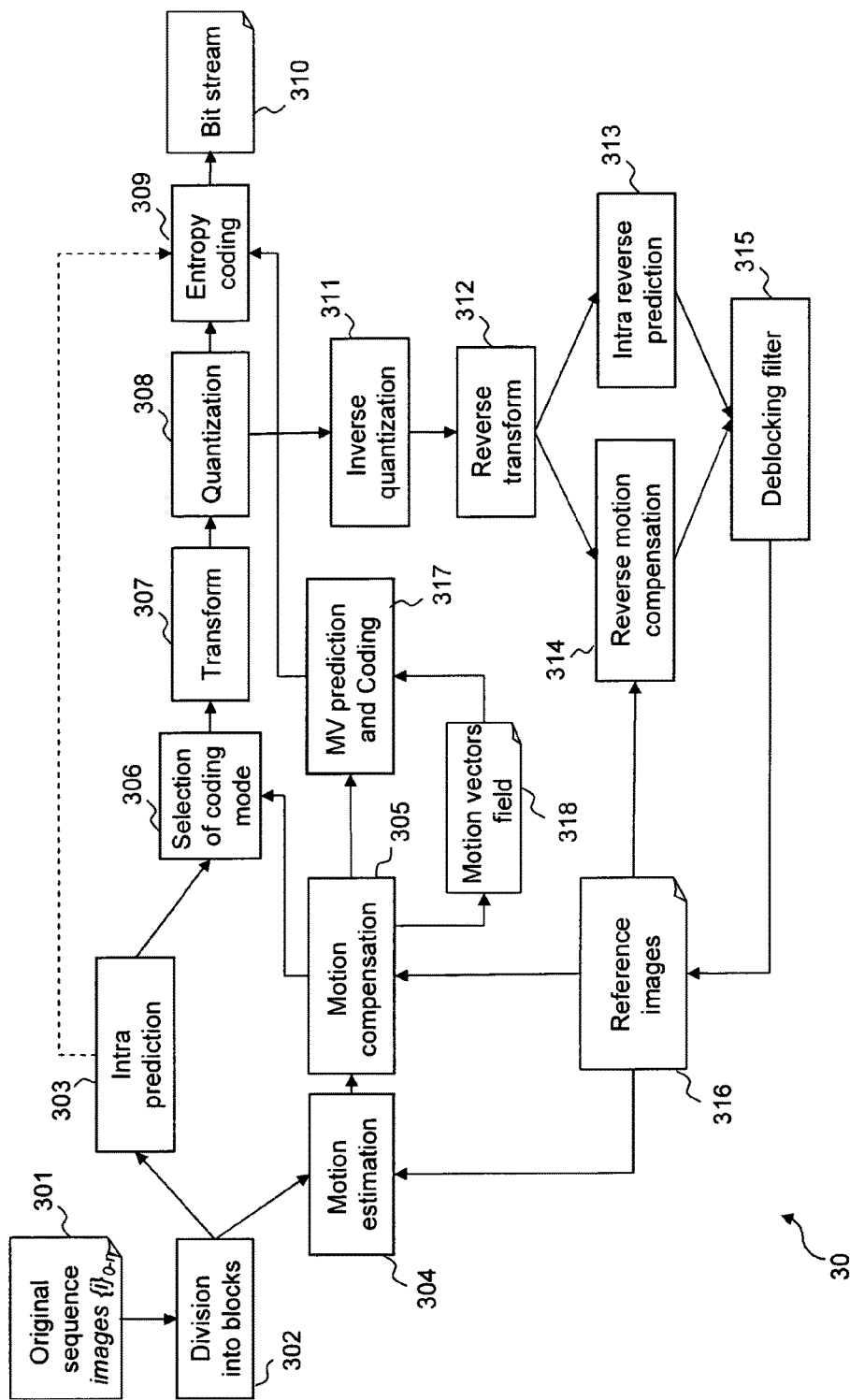
FIG. 5 shows a block diagram of parts of an encoder according to an embodiment of the present invention.

FIG. 5 illustrates a block diagram of an encoder 30 according to an embodiment of the invention. The encoder is represented by connected modules, each module being adapted to implement, for example in the form of programming instructions to be executed by the CPU 1111 of apparatus 1000, a corresponding step of a method implementing an embodiment of the invention.

An original sequence of digital images $i_0$ to $i_n$ 301 is received as an input by the encoder 30. Each digital image is represented by a set of samples, known as pixels.

A bitstream 310 is output by the encoder 30.

The bitstream 310 comprises a plurality of encoding units or slices, each slice comprising a slice header for encoding values of encoding parameters used to encode the slice and a slice body, comprising encoded video data. In HEVC these slices are divided into non-overlapping Largest Coding Units (LCUs), generally blocks of size 64 pixels×64 pixels. Each LCU may in its turn be iteratively divided into smaller variable size Coding Units (CUs) using a quadtree decomposition. Each CU can be further partitioned into a maximum of 2 symmetric rectangular Partition Units (PUs).

Figure 6:
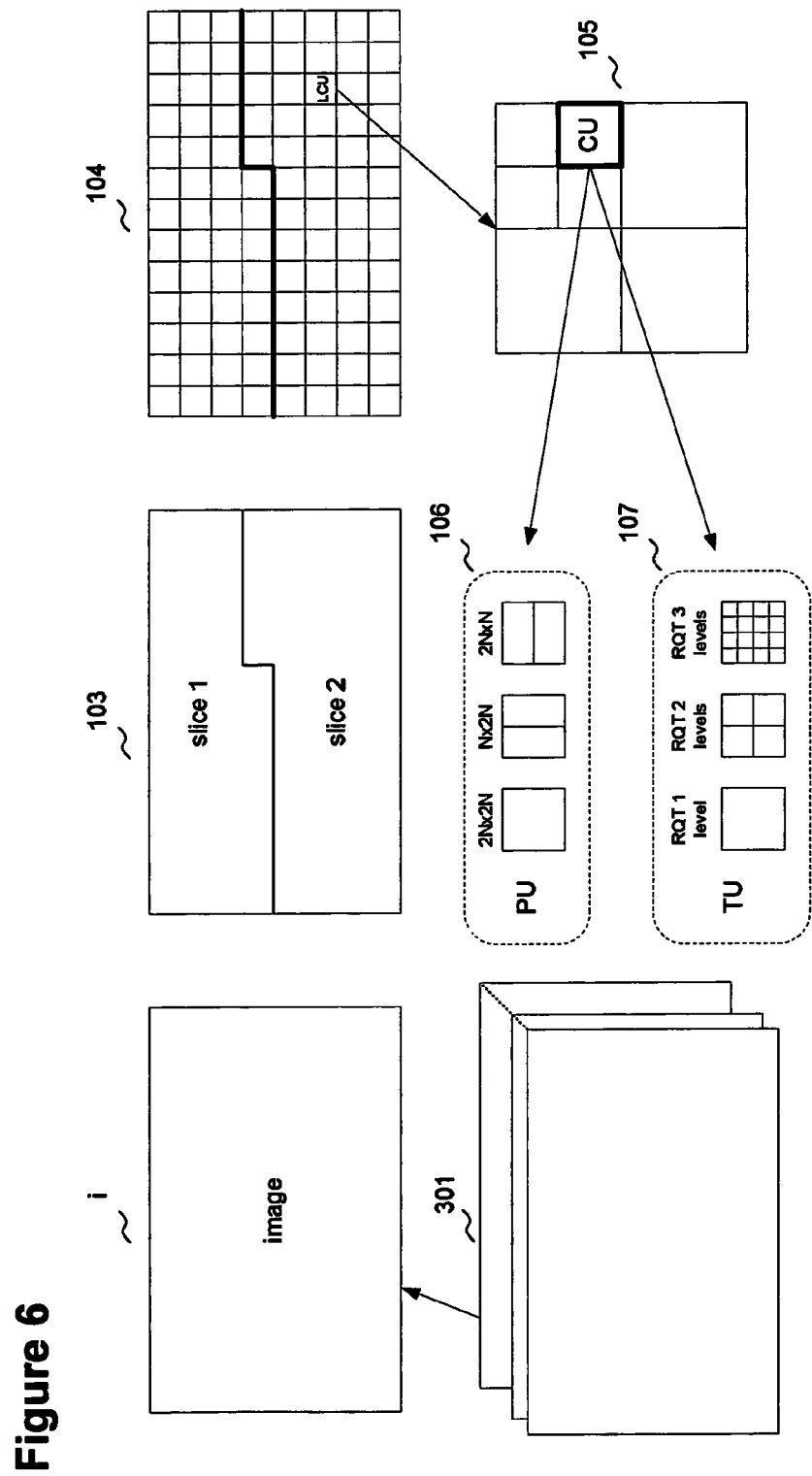
FIG. 6 shows a sequence of images processed by the encoder of FIG. 5.

FIG. 6 shows the sequence 301 of digital images i, slices 103, LCUs 104, CUs 105, PUs 106 and TUs 107. A TU (Transform Unit) is defined separately from PU for transform and quantization in CU.

Note that, in the following description we use the term "block" in place of the specific terminology CU and PU used in HEVC A CU or PU is a block of pixels.

Returning to FIG. 5 the input digital images i are divided into blocks by module 302. These blocks are image portions and may be of variable sizes (e.g. 4×4, 8×8, 16×16, 32×32, 64×64).

A coding mode is selected for each input block by module 306. The module 306 is described later.

There are two families of coding modes, spatial prediction coding or Intra coding, and temporal prediction coding or Inter coding. The possible coding modes are tested.

Module 303 implements Intra prediction, in which the given block to encode is predicted by means of an "Intra" predictor, a block of pixels constructed from the information already encoded, for example computed from pixels of the neighbourhood of said block to encode. An indication of the Intra predictor selected and the difference between the given block and its predictor is encoded if the Intra coding is selected by the module 306.

Temporal prediction is implemented by modules 304 and 305. Firstly a reference image among a set of reference images 316 is selected, and a portion of the reference image, also called reference area, which is the closest area to the given block to encode, is selected by the motion estimation module 304. Generally, the motion estimation module 304 uses a block matching algorithm (BMA).

With regard to the "Inter" coding, two prediction types are possible. Mono-prediction (P-type) consists of predicting the block by referring to one reference area from one reference image. Bi-prediction (B-type) consists of predicting the block by referring to two reference areas from one or two reference images. In the module 304 an estimation of motion between the current block and reference images 316 is made in order to identify, in one or several of these reference images, one (P-type) or several (B-type) blocks of pixels to use as predictors of this current block. In the case where several block predictors are used (B-type), they are merged to generate a single prediction block. The reference images used are images in the video sequence that have already been coded and then reconstructed (by decoding).

The difference between the selected reference area and the given block, also called a residual block, is computed by the motion compensation module 305. The selected reference area is indicated by a motion vector.

Information relative to the motion vector and the residual block is encoded if the Inter prediction is selected by the module 306. To further reduce the bitrate, the motion vector is encoded by difference with respect to a motion vector predictor. A set of motion vector predictors, also called motion information predictors, is obtained from the motion vectors field 318 by a motion vector prediction and coding module 317. The operation of the module 317 will be described later in detail with respect to FIGS. 8 and 9.

The module of selection of the coding mode 306 uses an encoding cost criterion, such as a rate-distortion criterion, to determine which is the best mode among the Intra and Inter prediction modes. A transform 307 is applied to the residual block, the transformed data obtained is then quantized by module 308 and entropy encoded by module 309. The transform is applied to the aforementioned Transform Unit (TU) that is included in a block. A TU can be further split into smaller TUs using a so-called Residual QuadTree (RQT) decomposition, as shown in FIG. 6. In HEVC, generally 2 or 3 levels of decompositions are used and authorized transform sizes are from 32×32, 16×16, 8×8 and 4×4. The transform basis is derived from a discrete cosine transform DCT.

Finally, the encoded residual block of the current block to encode is inserted in the bitstream 310, along with the information relative to the predictor used. For the blocks encoded in 'SKIP' mode, only a reference to the predictor is encoded in the bitstream, without any residual block.

In order to calculate the "Intra" predictors or to make an estimation of the motion for the "Inter" predictors, the encoder performs a decoding of the blocks already encoded by means of a so-called "decoding" loop 311-315. This decoding loop makes it possible to reconstruct the blocks and images from the quantized transformed residuals.

The quantized transformed residual is dequantized in module 311 by applying the reverse quantization to that provided by module 308 and reconstructed in module 312 by applying the reverse transform to that of the module 307.

If the residual comes from an "Intra" coding, then in module 313 the used "Intra" predictor is added to this residual in order to recover a reconstructed block corresponding to the original block modified by the losses resulting from a transformation with loss, here quantization operations.

If the residual on the other hand comes from an "Inter" coding, the blocks pointed to by the current motion vectors (these blocks belong to the reference images 316 referred to by the current image indices) are merged then added to this decoded residual in module 314. In this way the original block, modified by the losses resulting from the quantization operations, is obtained.

A final loop filter 315 is applied to the reconstructed signal in order to reduce the effects created by heavy quantization of the residuals obtained and to improve the signal quality. The loop filter comprises two steps, a "deblocking" filter and a linear filtering. The deblocking filtering smoothes the borders between the blocks in order to visually attenuate these high frequencies created by the coding. The linear filtering further improves the signal using filter coefficients adaptively determined at the encoder. The filtering by module 315 is thus applied to an image when all the blocks of pixels of this image have been decoded.

The filtered images, also called reconstructed images, are then stored as reference images 316 in order to allow the subsequent "Inter" predictions taking place during the compression of the following images of the current video sequence.

In the context of HEVC, it is possible to use several reference images 316 for the estimation and motion compensation of the current image. In other words, the motion estimation is carried out on N images. Thus the best "Inter" predictors of the current block, for the motion compensation, are selected in some of the multiple reference images. Consequently two adjoining blocks may have two predictor blocks that come from two distinct reference images. This is in particular the reason why, in the compressed bit stream, the index of the reference image (in addition to the motion vector) used for the predictor block is indicated.

The use of multiple reference images is both a tool for resisting errors and a tool for improving the compression efficacy. The VCEG group recommends limiting the number of reference images to four.

Figure 7:
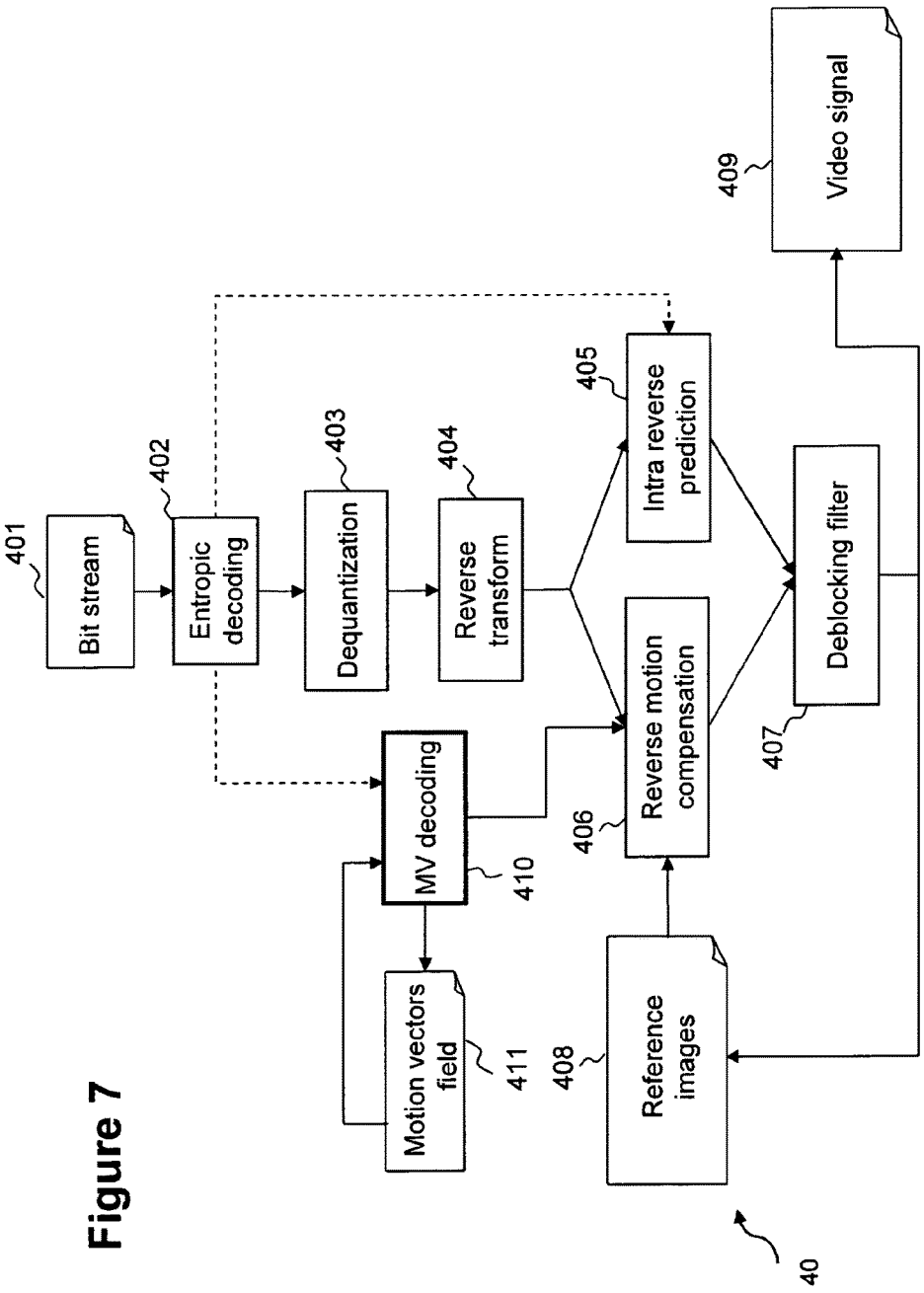
FIG. 7 illustrates a block diagram of parts of a decoder according to an embodiment of the invention.

FIG. 7 illustrates a block diagram of a decoder 40 according to an embodiment of the invention. The decoder is represented by connected modules, each module being adapted to implement, for example in the form of programming instructions to be executed by the CPU 1111 of apparatus 1000, a corresponding step of a method implementing an embodiment of the invention.

The decoder 40 receives a bitstream 401 comprising encoding units, each one being composed of a header containing information on encoding parameters and a body containing the encoded video data. As explained earlier with reference to FIG. 5, the encoded video data is entropy encoded, and the motion vector predictors' indexes are encoded, for a given block, on a predetermined number of bits. The received encoded video data is entropy decoded by a module 402, dequantized by a module 403 and then a reverse transform is applied by a module 404.

In particular, when the received encoded video data corresponds to a residual block of a current block to decode, the decoder also decodes motion prediction information from the bitstream, so as to find the reference area used by the encoder.

A module 410 applies the motion vector decoding for each current block encoded by motion prediction. Similarly to module 317 of the encoder of FIG. 5, the motion vector decoding module 410 uses information (the motion vectors field 411, which is similar to the motion vectors field 318 in FIG. 5) relating to motion vectors from the current frame and from reference frames to generate a set of motion vector predictors. The operation of the module 410 will be described in more detail later with reference to FIG. 10. If the bitstream is received without losses, the decoder generates exactly the same set of motion vector predictors as the encoder. Once the index of the motion vector predictor for the current block has been obtained, if no losses have occurred, the actual value of the motion vector associated with the current block can be decoded and supplied to a module 406 which applies reverse motion compensation. The reference area indicated by the decoded motion vector is extracted from a reference image among stored reference images 408 and also supplied to the module 406 to enable it to apply the reverse motion compensation.

In case an Intra prediction has been applied, an inverse Intra prediction is applied by a module 405.

As a result of the decoding according to either Inter or Intra mode, a decoded block is obtained. A deblocking filter is applied by a module 407, similarly to the deblocking filter 315 applied at the encoder. A decoded video signal 409 is finally provided by the decoder 40.

Figure 8:
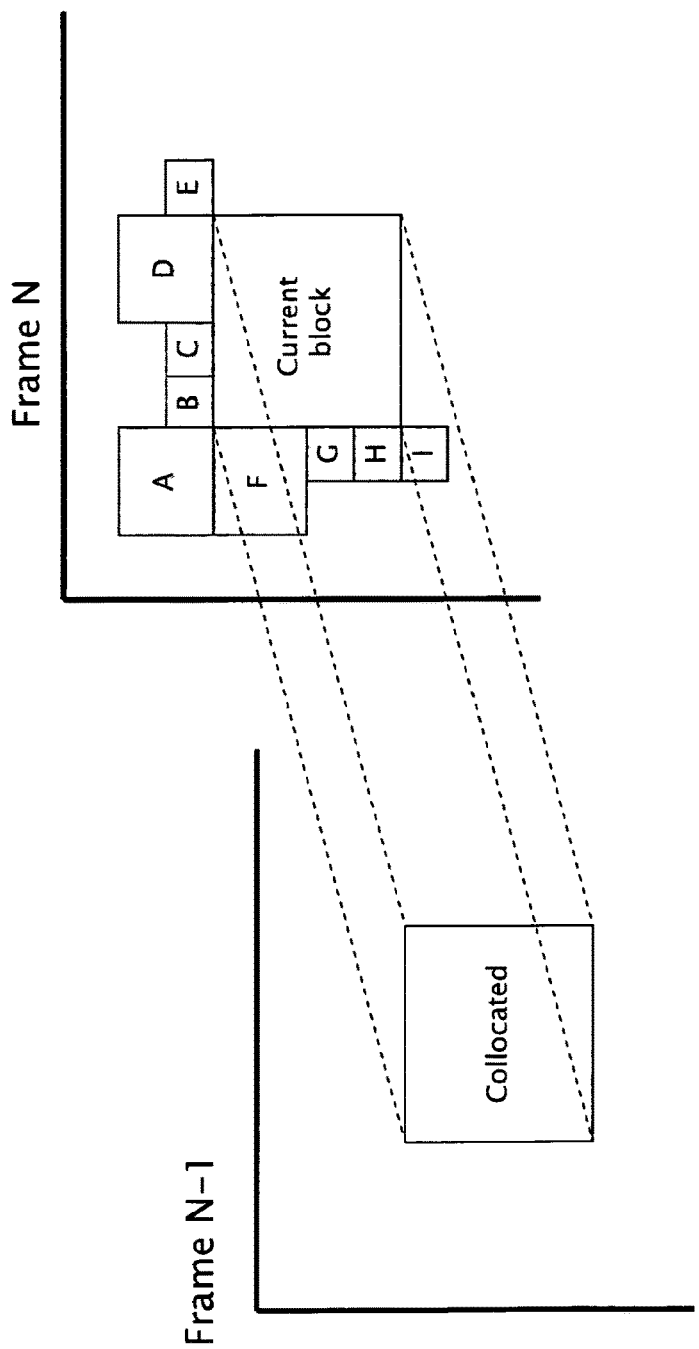
FIG. 8 is a schematic diagram for use in explaining a method of determining a set of motion vector predictors which can be used by the encoder of FIG. 5 and the decoder of FIG. 7.

FIG. 8 is a schematic diagram for use in explaining the generation of the set of motion vector predictors or motion vector candidates in the current HEVC implementation.

In the current HEVC design, motion vectors are coded by predictive coding, using a plurality of motion vectors. This method is called Advanced Motion Vector Prediction (AMVP) and was adapted to consider the new HEVC context with large block structure. This scheme is applied to the Skip, Inter and Merge modes.

The method allows the selection of the best predictor from a given set, where the set is composed of spatial motion vectors and temporal motion vectors. The optimal number of spatial and temporal predictors is still being evaluated in the HEVC standardization process. However, as at the filing date of the present application, the current implementation includes 2 spatial predictors and one temporal collocated predictor for the Skip and Inter modes, and 4 spatial predictors and one temporal predictor for the Merge mode. The present invention is not confined to being used with the current implementation of AMVP. The implementation of AMVP may change from the current one described below but it is envisaged that embodiments of the present invention to be described below will provide the same advantageous effects and results with other implementations that may be adopted.

Moreover in JCTVC-D072 referred to in the introduction it was proposed to use more temporal predictors instead of using only one in the current version. The invention can also be applied with this modification.

In the predictor set represented in FIG. 8, the two spatial motion vectors are chosen among those above and among left blocks including the above corner blocks and left corner block.

The left predictor is selected from among the blocks I, H, G, F. The motion vector predictor is considered available if the vector exists and if the reference frame index is the same as the reference frame index of the current block (meaning that the motion vector used as a predictor points to the same reference frame as the motion vector of the current block). The selection is performed by means of a search from bottom (I) to top (F). The first predictor which meets the availability criteria above is selected as the left predictor (only one left predictor is added to the predictor set). If no predictor meets the criteria, the left predictor is considered unavailable.

An inter block can be mono-predictive (type P) or bi-predictive (type B). In a P-frame, inter blocks are only of type P. In a B-frame, inter blocks are of type P or B. In a type P inter block, a list L0 of reference frames is used. Its motion vector refers to one reference frame among this list. A reference index is therefore associated with the motion vector. In a type B inter block, two lists L0 and L1 of reference frames are used. One of its two motion vectors refers to one reference frame among list L0, and the other of its two motion vectors refers to one reference frame among list L1. A reference index is therefore associated with each of the two motion vectors.

The non-existence of a motion vector means that the related block was Intra coded or that no motion vector exists in the list with which the coded motion vector is associated. For example, for a block in a B frame, if a neighboring block has only one motion vector in list 'L1' and the current motion vector is in 'L0', the neighboring motion vector is considered as not existing for the prediction of the current motion vector.

The top predictor is selected from among the blocks E, D, C, B, A, again as a result of a search, in this case from right to left. The first motion vector, from right to left, that meets the availability criteria defined above (if the predictor exists and has the same reference frame as the current motion vector) is selected as the top predictor. If no predictor validates the criteria, the top predictor is considered unavailable.

The temporal motion vector predictor comes from the nearest reference frame when the frames are not ordered differently for the coding and for the display (they are encoded successively without reordering). This configuration corresponds to a low delay configuration (no delay between the decoding process and the display process). In case of B frames, 2 motion vectors are considered for the collocated block. One is in the first list "L0" of reference images and one in the second list "L1" of reference images. If both motion vectors exist, the motion which has the shortest temporal distance is selected. If both predictors have the same temporal distance, the motion form "L0" is selected. The motion vector collocated selected is then scaled, if needed, according to the temporal distance between the reference image and the image containing the block to encode. If no collocated predictor exists, the predictor is considered unavailable.

For hierarchical B frames coding, which involves reordering frames and therefore more decoding delay, 2 collocated motion vectors can be considered. Both come from the future reference frame. The motion vector which crosses the current frame is selected. If both predictors cross the current frame, the block containing the motion vector which has the shortest temporal distance is selected. If both predictors have the same temporal distance, the motion vector from the first list "L0" is then selected. The collocated motion vector selected as the temporal motion vector predictor is then scaled, if needed, according to the temporal distance between the reference image and the image containing the block to encode. If no collocated predictor exists, the predictor is considered unavailable.

For both low delay and hierarchical cases, when the collocated block is divided into a plurality of partitions (potentially, the collocated block contains a plurality of motion vectors), the motion vector selected comes from the center partition, as mentioned in the introduction to the present specification, see Jung, G. Clare, (Orange Labs), "Temporal MV predictor modification for MV-Comp, Skip, Direct and Merge schemes", JCTVC-D164, Daegu, KR, 20-28 Jan., 2011 proposes using a centered temporal predictor, and WO 2011/001077 A.

As a result of this method of generating the motion vector predictors, the set of predictors generated can contain 0, 1, 2 or 3 predictors. If no predictor could be included in the set, the motion vector is not predicted. Both vertical and horizontal components are coded without prediction. (This corresponds to a prediction by a predictor equal to the zero value.) In the current HEVC implementation, the index of the predictor is equal to 0.

The Merge mode is a particular Inter coding, similar to the usual Skip mode well known by persons skilled in the art. The main difference compared to the usual Skip mode is that the Merge mode propagates the value of the reference frame index, the direction (Bi directional or uni-directional) and the list (with the uni-directional direction) of the motion vector predictors to the predicted block. The Merge mode uses a motion vector predictor and its reference frame index, unless the predictor is a temporal predictor where the reference frame considered is always the closest preceding reference frame also called Ref0 (and always bi prediction for B frames). So the block predictors (the copied blocks) come from the reference frames pointed by the motion vector predictors.

The ordering of candidates in the set is important to reduce the overhead of signaling the best motion predictor in the predictor set. The ordering of the set is adapted depending on the current prediction mode to position the most probable motion predictor in the first position, since minimum overhead occurs if the first candidate is chosen as the best predictor. In the current implementation of HEVC, the temporal predictor is the first position.

The overhead of signaling the index of the best predictor can be reduced further by minimizing the number of candidates in the set. Duplicated motion vectors are simply removed from the set.

For the particular case of the Merge mode, the suppression process takes into account the values of the motion vector and its reference frame. Accordingly, to determine if two predictors are duplicate predictors, the two components of the motion vector and its reference index are compared for the two predictors and only if these three values are equal is one predictor is removed from the set. For a B frame, this equality criterion is extended to the direction and the lists. So, two predictors are considered as duplicated predictors if they both use the same direction, the same lists (L0, L1, or L0 and L1), the reference frame indexes and have the same values of the motion vectors (MV_L0 and MV_L1 for bi prediction).

In AMVP, the index signaling depends on the result of the motion vector predictor suppression process described above. Indeed, the number of bits allocated to the signaling depends on the number of motion vectors remaining after the suppression. For instance, if at the end of the suppression process, only one motion vector remains, no overhead is required to signal the motion vector predictor index, since the index can easily be retrieved by the decoder. Table 1 below shows the codeword for each index coding according to the number of predictors after the suppression process.

TABLE 1

| | Codeword according to the number N of predictors in the set | | | | |
|---|---|---|---|---|---|
| Index | N = 1 | N = 2 | N = 3 | N = 4 | N = 5 |
| 0 | (inferred) | 0 | 0 | 0 | 0 |
| 1 | | 1 | 10 | 10 | 10 |
| 2 | | | 11 | 110 | 110 |
| 3 | | | | 111 | 1110 |
| 4 | | | | | 1111 |

Figure 9:
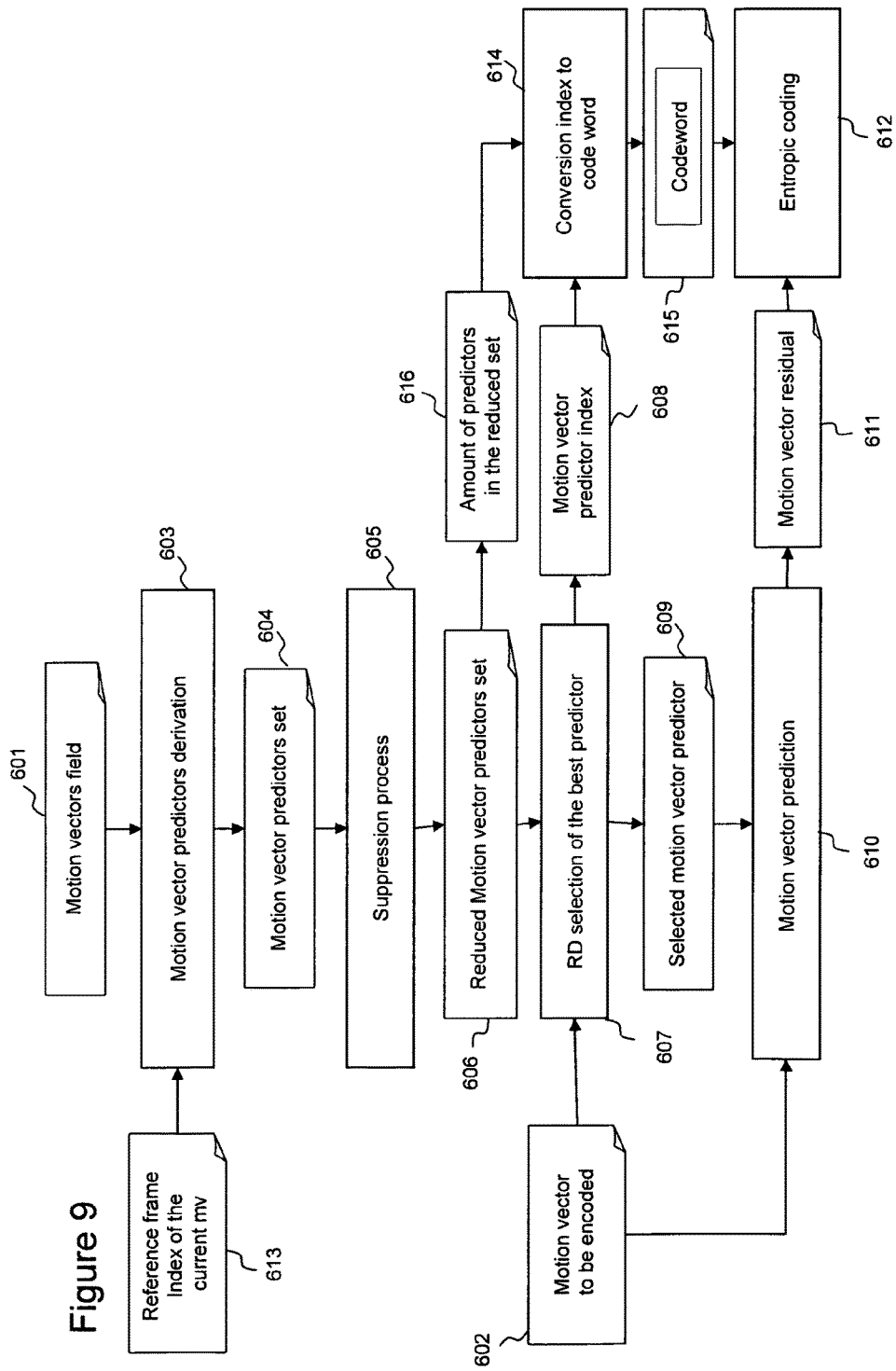
FIG. 9 is a flowchart of the steps carried out by the encoder of FIG. 5 when the method of FIG. 8 is used.

FIG. 9 is a flow chart for use in explaining operation of the AMVP scheme at the encoder side. The operations in FIG. 9 are carried out by module 317 in FIG. 5, except where indicated otherwise, and this module 317 can be considered to comprise modules 603, 605, 607, 610 and 615 in FIG. 9. The motion vectors field 601 in FIG. 9 corresponds to the motion vectors field 318 in FIG. 5. The entropy encoder module 612 in FIG. 9 corresponds to the entropy encoder module 309 in FIG. 5. All the operations in FIG. 9 can be implemented in software and executed by the central processing unit 1111 of the apparatus 1000.

A motion vector predictors generation module 603 receives a reference frame index 613 of the current motion vector to encode and also receives the motion vectors field 601. The module 603 generates a motion vector predictors set 604 as described above with reference to FIG. 8 by taking into account the reference frame index 613. Then the suppression process is applied by a module 605, as also described above with reference to FIG. 8. The module 605 produces a reduced motion vector predictors set 606. The number of motion vector predictors 616 in the reduced set 606 is output as well. A module 607 receives the motion vector to be encoded 602 and applies a rate-distortion (RD) selection of the best predictor among the reduced motion vector predictors set 606. If a best predictor is selected, the module 607 outputs a motion vector predictor index 608 and the selected motion vector predictor 609. Then, a module 610 forms the difference between the motion vector to be encoded 602 and the selected motion vector predictor 609. This difference is a motion vector residual 611. This motion vector residual is then entropically encoded in a module 612. A module 614 converts the motion vector predictor index 608 into a codeword 615 according to the number of predictors 616 in the reduced motion vector predictors set 606 as described above with reference to Table 1. As described above, if this set contains only one predictor, no index is transmitted to the decoder side and no codeword is generated. If the set contains one or more predictors the codeword is generated in the module 614 and then entropy coded in the module 612.

Figure 10:
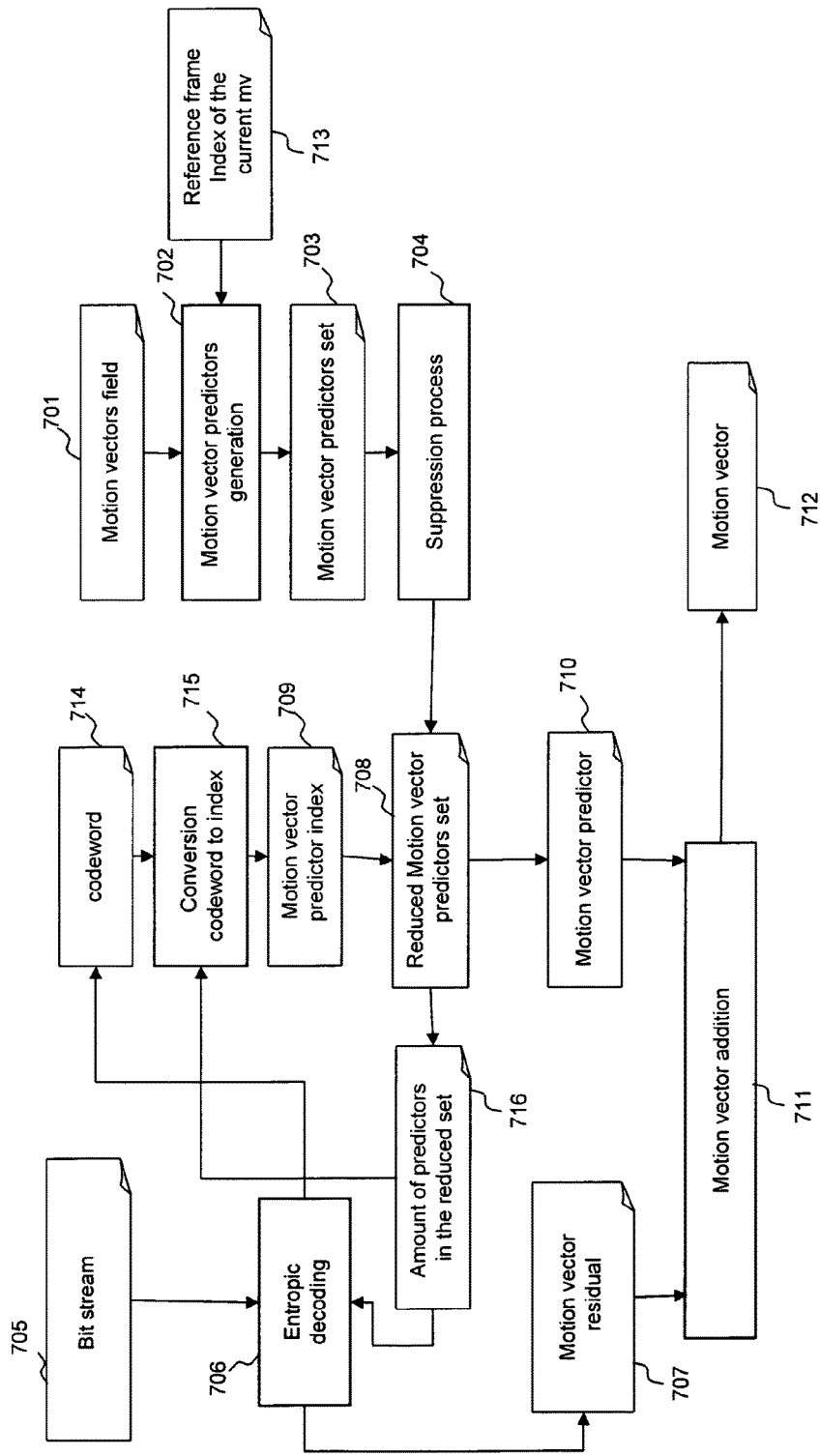
FIG. 10 is a flowchart of the steps carried out by the decoder of FIG. 7 when the method of FIG. 8 is used.

FIG. 10 is a flow chart for use in explaining operation of the AMVP scheme at the decoder side. The operations in FIG. 10 are carried out by module 410 in FIG. 7, except where indicated otherwise, and this module 410 can be considered to comprise modules 702, 704, 711 and 715 in FIG. 10. A motion vectors field 701 in FIG. 10 corresponds to the motion vectors field 411 in FIG. 7. An entropy decoder module 706 in FIG. 10 corresponds to the entropy decoder module 402 in FIG. 7. All the operations in FIG. 10 can be implemented in software and executed by the central processing unit 1111 of the apparatus 1000.

A module 702 receives the motion vectors field 701 of the current frame and of the previous decoded frames. The module 702 also receives a reference frame index 713 of the current motion vector to be decoded. The module 702 generates a motion predictors set 703 based on the motion vectors field 701 and the reference frame index 713. This processing is the same as that described in relation to the module 603 on the encoder side. Then a suppression process is applied by a module 704. This processing is the same as that described in relation to the module 605 on the encoder side. The module 704 produces a reduced motion vector predictors set 708. The number of motion vector predictors 716 in the reduced set 708 is output as well.

The entropy decoder module 706 extracts a motion vector residual 707 from the bitstream 705 and decodes it. The number of predictors 716 in the reduced set 708 is then used by the module 706 to extract (if needed) the motion vector predictor codeword 714. This codeword (if it exists) is converted by a module 715 into a predictor index value 709 according to the number of the predictors 716 in the reduced set, using Table 1 above for the conversion. The motion vector predictor 710 is then extracted from the reduced set 708 according to the predictor index value 709. A module 711 adds the motion vector predictor to the motion residual 707 in order to produce the decoded motion vector 712.

From the foregoing it is clear that, for each frame that is used as a reference frame for the derivation of the collocated motion vector predictor, it is necessary to store at the encoder and decoder sides its related motion vectors. This leads to the size of the motion vector memory becoming significant, considering firstly the granularity of motion representation (in the current HEVC design, the minimum block size in the Inter mode is 4×4) and secondly that there are two vectors per motion block for B_SLICE. It is estimated that for 4K×2K resolution pictures, and using a granularity of one motion vectors set per 4×4 block, 26 Mbits are required per frame. The motion vector memory has to be fast memory and is typically part of RAM, for example the RAM 1112 in FIG. 4. This is expensive, especially for portable devices.

First Embodiment

A first embodiment of the present invention will now be described.

Figure 1:
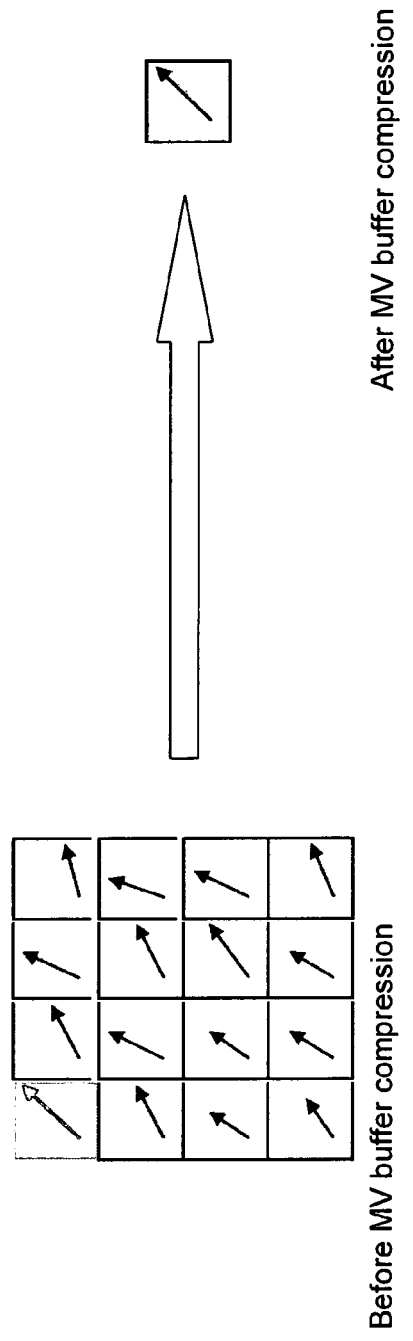
FIG. 1, discussed hereinbefore, is a schematic diagram for use in explaining a prior proposal for reducing the motion vector memory requirement.

In the first embodiment, as in the proposals JCTVC-C257 and JCTVC-D072 mentioned in the introduction and shown in FIG. 1, one block position is used for the block summarization of a set of N×N motion vectors. The motion vector of the block corresponding to this one block position is stored as a representative motion vector for the entire N×N set. These prior proposals use exclusively the top left block position, as shown in FIG. 1. However, this way of summarization fails to take into account that the collocated motion vector predictor is used in a competitive scheme with other spatial predictors. As a result, although these prior proposals offer a significant reduction in the motion vector memory requirement (e.g. a factor of 16 reduction in the example of FIG. 1), they involve a penalty in terms of coding efficiency. For example, it is estimated that the use of 16 times reduction in the memory requirement results in a 0.5% loss in the coding efficiency in TMuC v0.9. This occurs because often the motion vector at the top left block position of the collocated block is similar to the spatial predictors from the blocks neighbouring the current block to encode. This means that the collocated motion vector predictor does not bring enough diversity to the predictor set as a whole.

By using a different block position within the collocated block, or even using a block position in another block neighbouring the collocated block, a greater degree of diversity can be obtained. The effect of this is that, despite still achieving the same reduction in the motion vector memory requirement as the prior proposals mentioned above, the present embodiment incurs no or no significant coding efficiency penalty compared to a system in which all the motion vectors are stored and no block summarization is used.

Embodiments of the present invention recognize that the diversity of the predictor set including a mixture of spatial and temporal predictors depends on the relative positions of the blocks from which the predictors come. The greater the distance of one predictor from another, the more likely the predictors are to be diverse. Thus, it may be preferable to select as the block position in the collocated block a block position further from the block positions of the spatial predictors. Of course, the distance must not be so great that the temporal predictor is no longer representative of the motion vectors in the collocated block. After all, the collocated block is selected as a source of the temporal predictor precisely because it is collocated with the current block. Accordingly, what is required is to choose a block position for the temporal predictor that affords controlled diversity between that predictor and the spatial predictors.

It will be appreciated that in AMVP the spatial predictors are selected from among certain positions (the positions A to I shown in FIG. 8) according to availability criteria. This means that depending on availability, 0, 1 or 2 spatial predictors may be selected. The block position to choose for block summarization of the collocated block cannot take the actual spatial predictor selection(s) into account because it is carried out before the spatial predictor selection(s). To make it possible to take the spatial predictor selection(s) into account when choosing the block position of the collocated block it would be necessary to store the motion vectors at all block positions in the collocated block, which is incompatible with reducing the motion vector memory requirement.

Incidentally, however, when the object is not to reduce the memory requirement but to improve the coding efficiency, it is possible to take the spatial predictor selection(s) into account when choosing the block position of the collocated block, as will be described in later embodiments.

In the current implementation of the HEVC test model, for a current Skip or Inter block, two spatial predictors are used as described above with reference to FIG. 8, whereas four spatial predictors are used for the Merge mode. However the Merge mode is selected less frequently than Skip and Inter modes. Accordingly, in the present embodiment it is assumed that we have 2 spatial predictors, namely the left predictor and the top predictors as shown in FIG. 8. The present embodiment can easily be extended when more or less predictors are used in the spatial predictors set. Moreover, the description of this embodiment relates to motion vector memory compression based on a 4×4 block summarization. This can easily be extended to all other sizes used for block summarization.

Figure 11:
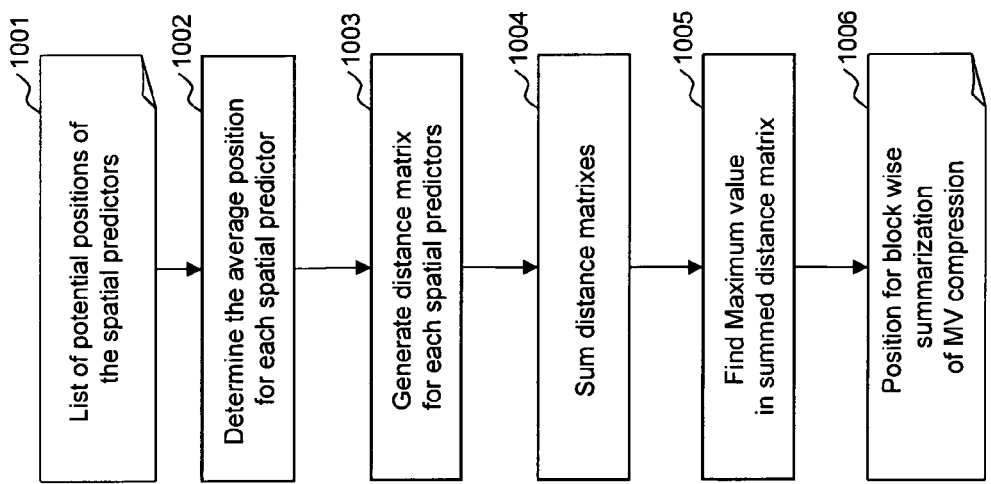
FIG. 11 is a flowchart of a motion vector block summarization method usable by the encoder of FIG. 5 and the decoder of FIG. 7.

FIG. 11 shows the steps of a method of determining a 4×4 block position whose motion vector will be selected as the single motion vector in the motion vector memory compression process of the first embodiment. As explained above, this can be considered to be a block summarization process because it results in one motion vector being selected as a representation of the block as a whole. The non-selected motion vectors of the block (e.g. 15 motion vectors in the present case), having block positions other than the determined block position, do not need to be stored, resulting in significant motion vector memory compression (e.g. by a factor of 16 in the present case).

Incidentally, in addition to the motion vectors themselves (each having vertical and horizontal components and a reference frame index), the selection of the block position could be applied to all other data needed for the derivation process of the collocated predictor (the current implementation of the MV memory compression does not take into account the other data). These data are: the mode (Inter/Intra), the reference frame index of the motion vector, the list 'L0' 'L1' of reference images, and the direction Bi or uni-directional.

In a first step S1001 a list of potential positions of the spatial predictors is received. These positions are relative positions compared to the current block. For block summarization purposes, we can consider that the size (in pixels) of the current block is 16×16 when the summarization of the 4×4 block of motion vectors is applied as depicted in FIG. 1. So, the potential positions A, B, C, D, E for the top predictor and the potential positions F, G, H, I for the left predictor of FIG. 8 are received by the algorithm. For simplicity, we can consider that the neighboring blocks have the minimum CU size equal to 4×4 (in pixels) as depicted in FIG. 12. In that case, all spatial predictor blocks have the same size which is the size of the blocks which will be summarized in the MV memory compression. As depicted in FIG. 12, the potential positions of the top predictor are TP1-TP6 and the potential positions of the left predictor are LP1-LP5. Then, in step S1002 the algorithm determines the average position for each spatial predictor. In our simplified example of FIG. 12, the average position for the left predictor is the position of the block LP3, and the average position for the top predictor is the boundary between blocks TP3 and TP4. Because the average position for the top predictor is the boundary between blocks TP3 and TP4 the positions of both blocks TP3 and TP4 are considered in the subsequent processing, whereas for the left predictor only the position of block LP3 is considered in the subsequent processing. Then, a distance matrix for each predictor is generated in step S1003. This matrix has a cell for each possible block position of the block being summarized and contains in each cell the minimum distance between the average position of the predictor concerned (the top predictor or the left predictor, as the case may be) and the possible block position of the cell concerned. The possible block positions are numbered from 1 to 16 in FIG. 12 according to a zigzag representation adopted for the motion vector memory. The construction of this matrix is explained below with reference to FIGS. 13A to 13C. Then, in step S1004 the distance matrices of both predictors are summed cell by cell in order to obtain a single overall distance matrix. In step S1005 the maximum value in this overall distance matrix is identified. The position corresponding to this maximum value is the position used for the block summarization of the MV memory compression (1006).

To generate the minimum distance matrix between the average position and each possible block position numbered from 1 to 16 in FIG. 12, we can consider the number of blocks that need to be traversed to reach the block position when starting from the average position for the predictor concerned. For example, with this measure, as depicted in FIG. 13A, which shows the distance matrix for the left predictor, the minimum distance between the relevant average position LP3 and the block position numbered 7 in FIG. 12 is 4. This follows because to reach this position, we need to traverse block positions numbered 9, 3, 4 and 7, which is 4 blocks. In this measure, we have not considered the diagonal case to compute the distance but such a case could be used if desired. Moreover, other distance measures could be used in the present algorithm.

FIGS. 13A and 13B show respectively the distance matrixes computed with this measure for the left and top predictors. Moreover, FIG. 13C shows the overall distance matrix formed by summing cell-by-cell these two matrixes of FIGS. 13A and 13B.

It can be observed that the maximum value is 10 for the block position numbered 16 (cf. FIG. 12), which is the bottom right block position. This is the block position identified by the algorithm in the case that the top and left predictors are used.

In the first embodiment, the same algorithm is carried out by the decoder as well, and the decoder selects the same block position as the encoder, and avoids storing the motion vectors of the non-selected block positions. Thus, a similar reduction in the motion vectors memory requirement is achieved at the decoder as well.

Second Embodiment

In the first embodiment no account is taken of the likelihood of selection of the spatial predictors at the different positions TP1-TP6 and LP1 to LP5. However, in the AMVP process, the search for the top predictor starts from the right-most position and moves to the left-most position, as already described with reference to FIG. 8. Thus, it is expected that the predictor at position TP6 will be selected more frequently than the predictor at position TP5, and so on from right to left in FIG. 12. The same is true for the left predictor, for which the search starts at the bottom position and moves upwards to the top position. Taking account of the relative frequencies of selection it may be preferable to adjust the average position for the top predictor to the right and the average position for the left predictor downwards. The average position for each predictor could be calculated as a weighted average of the potential positions, with the weights reflecting the relative selection frequencies.

Third Embodiment

In the first and second embodiments described above, the encoder uses two spatial predictors (the top and left predictors). In the third embodiment, the encoder uses only one spatial predictor in the spatial predictors set. For example, if only the left predictor is used, the distance matrix of the left predictor given in FIG. 13A is used to find the best position. In that case, the position selected is block position number 6, the top right block. If only the top predictor is used, two block positions have the maximum value (block position number 11 and block position number 16). In that case, if AMVP is used as described with reference to FIG. 8, theoretically the predictors from the right side are more selected than the predictors from the left side (as explained, the predictors are selected from E to A in the HEVC derivation process). So, the algorithm can consider the use of the block numbered 11, because it should be the farthest block.

Fourth Embodiment

In the first, second and third embodiments described above, it is assumed that all blocks to encode can have two spatial predictors (the top and left predictors). Accordingly, no distinction is made between blocks for the purposes of the block summarization.

In the fourth embodiment, at least one block is treated differently from another block for the purposes of block summarization.

For example, the encoder and the decoder can know some area of the image where only one or where neither spatial predictor exists. In particular, the encoder and the decoder know the frame boundary (the frame boundary has the same position for all frames). So, the algorithm can take into account this specific knowledge. For example, for the top left block of the frame no predictors are available. In that case, the algorithm can find that the best block position for the block summarization is the center of the block. For blocks along the top boundary, only the left predictor could be available, and the block position selected by the algorithm is the top right block position numbered 6 (as in the third embodiment). For blocks along the left boundary only some top predictors are available. The algorithm can find that the position is the block number 11, i.e. the bottom left position. Indeed the position TP1 in FIG. 12 is never available for the left boundary, so the average of the positions is TP4 (not the boundary between TP3 and TP4) and consequently the algorithm finds the block number 11 as the farthest position.

This embodiment can be extended for the slice boundary if all frames in the bitstream have exactly the same slicing (i.e. if each slice has the exactly the same position for all frames).

Fifth Embodiment

In the preceding embodiments the decoder carries out the same processing as the encoder to determine the block position for the block summarization.

In the fifth embodiment, only the encoder uses the algorithm and the position of the block used for the block summarization is transmitted to the decoder in the bitstream (Sequence/picture/slice header).

Sixth Embodiment

In the preceding embodiments the encoder (and, except for the fifth embodiment, the decoder) perform the algorithm of FIG. 11 to determine the block position.

In the sixth embodiment, the encoder and the decoder refer to a table which contains the block position according to the use or not of the spatial predictors. An example of such a table is given in Table 2 below. This table is determined in advance using the same algorithm as that of FIG. 11. This solution is less complex than applying the algorithm all the time. The following table show this particular table for the example previously described. The positions refer to FIG. 12.

| Available spatial predictors | BlocK positions for the summarization with N = 4 |
|---|---|
| X | 4 (center) |
| Left | 6 (Top right) |
| Top | 11 (bottom left) |
| Left and top | 16 (bottom right) |

Seventh Embodiment

This embodiment extends the idea of the sixth embodiment still further. The bottom right block position is always used for the block summarization whatever the spatial block used for AMVP or merge mode. This saves processing burden and there is no need to signal to the decoder which block position has been determined.

Eighth Embodiment

The preceding embodiments assume that block summarization is applied uniformly to all blocks. However, in HEVC, blocks of different sizes are permitted. The block positions for one size of block may not be optimal for another size of block. For example, the block positions shown in Table 2 have been found to work well for a small block, e.g. a 4×4 block, but in the case of a large block it may be better to use other block positions.

In the eighth embodiment, it is possible to take the block size into account when determining the block position. This can be achieved by having a distance matrix similar to that of FIG. 13C for each different block size.

Ninth Embodiment

Figure 2:
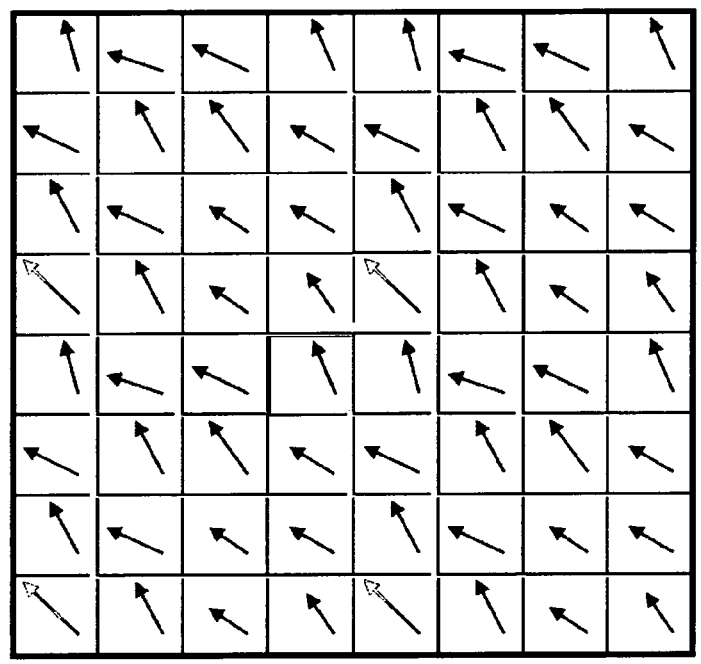
FIG. 2, also discussed hereinbefore, is a schematic diagram for use in explaining a prior proposal for improving the set of motion vector predictors.
Figure 3:
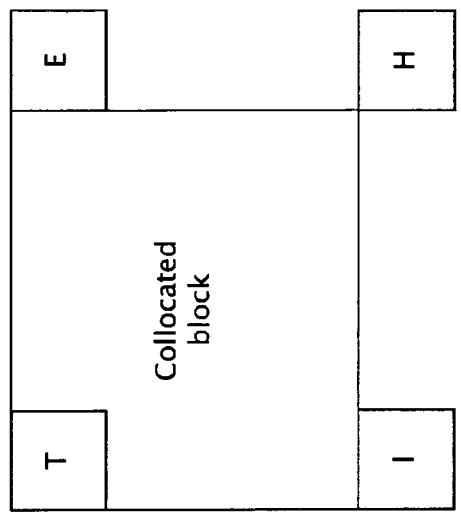
FIG. 3, also discussed hereinbefore, is a schematic diagram for use in explaining another prior proposal for improving the set of motion vector predictors.

It is possible to simplify the eighth embodiment by simply switching from one predetermined block position for a first block size to another predetermined block position for a second block size. For example, when the block size is small, e.g. smaller or equal to 16×16 (pixels), the bottom right block position could always be selected, whereas when the block size is large, e.g. a 32×32 (pixels), or higher, the centre block position could always be selected, see the shaded block position in FIG. 2.

Simulation results for this embodiment are promising. Bitrate savings (coding efficiency improvement) were obtained compared to using the centre block position on all occasions, as in the prior proposal JCT-VC D164 mentioned in the introduction.

If desired, a table of the kind shown in Table 2 could be provided for each block size, containing the block positions suitable for each permutation of the available predictors.

It is believed that the centre block position works better for bigger blocks than the bottom right position because the bottom right position in the case of a large block may not be so representative of the block as a whole as the centre block. This is not the case with small blocks, for which the bottom right position is still representative of the block as a whole due to the smaller distances involved and yet still introduces a controlled diversity with respect to the spatial predictors.

Tenth Embodiment

In the tenth embodiment, the block position(s) used in JCT-VC D164 are used for large blocks and the bottom right block position is used for small blocks.

Eleventh Embodiment

In the preceding embodiments, the block position selected for the block summarization has been one of the block positions in the collocated block. However, it is not necessary to limit the selected block position to one in the collocated block. For example, instead of the bottom right position of the collocated block it would be possible to use a block position in the vicinity of that bottom right position from another block in the same reference frame neighboring the collocated block. For example, the block position could be the bottom left position in the block to the immediate right of the collocated block, or the top right position in the block immediately below the collocated block, or the top left position in the block diagonally below and to the right of the collocated block.

Twelfth Embodiment

In JCT-VC D125, described in the introduction, 4 temporal predictors are used, one (T) from the collocated block and three others (E, H and I) from outside the collocated block at the top left, bottom left and bottom right corners of the collocated block. Instead of using T as one of the temporal predictors it would be possible to use the bottom right block position in the collocated block. This probably does not give a good compromise in term of diversity but in this the center should be the best. But in terms of coding of the predictor index this has an advantage because the bottom right may be equal more often to the predictor H (one predictor is often removed). Indeed in the contribution JCT-VC D125 too many predictors are used, so D125 increases the rate dedicated to the predictor index.

Thirteenth Embodiment

In the preceding embodiments the block position has been selected for the purpose of reducing the motion vector memory requirement.

In the thirteenth embodiment the block position is selected for the purpose of improving the coding efficiency. This is possible because if the temporal predictor from the reference frame, e.g. from a suitable block position in the collocated block, is chosen so as to achieve controlled diversity with the spatial predictors, then the temporal predictor tends to be a good competitor for the spatial predictor when the rate-distortion selection of the predictor is made. If the temporal predictor is a better predictor than the spatial predictors, as is often the case in practice, then improving this predictor (in the sense of making it closer to the required motion vector for the block to be encoded, and hence minimizing the residual) is good for coding efficiency.

In principle, all of the foregoing first to twelfth embodiments can be used to select the block position for the purpose of improving the coding efficiency. In the thirteenth embodiment, the motion vectors may all still be stored, i.e. it is not necessary to employ motion vector memory reduction. However, such a reduction is desirable in many cases.

Fourteenth Embodiment

If the motion vectors at all block positions are stored, it is possible to take account of the actual outcome of the selection of the spatial predictors when selecting the best block position. For example, in FIG. 12, if only the top predictor is available and position TP6 is selected the block position numbered 11 could be selected. If, on the other hand, only the top predictor is available and position TP1 is selected, then the block position numbered 16 could be selected. Other block positions would be better if a combination of top and left predictors was available, again depending on the positions of the selected top and left predictors. In general, for each possible outcome of the spatial predictor selection a best block position can be determined. The best block positions could be stored in a look-up table having an entry for each different outcome.

The embodiments described above are based on block partitions of input images, but more generally, any type of image portions to encode or decode can be considered, in particular rectangular portions or more generally geometrical portions.

More generally, any modification or improvement of the above-described embodiments, that a person skilled in the art may easily conceive should be considered as falling within the scope of the invention.

The invention claimed is:

1. A method of encoding a sequence of digital images into a bitstream, at least one block of an image being encoded by inter prediction with respect to a reference image block, comprising generating a set of motion vector predictors for a block to encode of a current frame, the set of motion vector predictors being permitted to include at least one spatial motion vector predictor and no more than one temporal motion vector predictor, the generating comprising selecting as said temporal motion vector predictor the motion vector at a predetermined position in the vicinity of a bottom right position of an area of the reference frame collocated with said block to encode of the current frame, and in a block of the reference frame neighboring the collocated area; selecting a motion vector predictor from the generated set as a motion vector predictor for encoding a motion vector associated with the block to encode; and encoding in the bitstream information identifying the selected motion vector predictor.

2. A method as claimed in claim 1, wherein said block of the reference frame is diagonally below and to the right of said collocated area, and the predetermined position is a top left position in said block of the reference frame.

3. A method of decoding a bitstream comprising an encoded sequence of digital images, at least one block of an image to be decoded having been encoded by inter prediction with respect to a reference image block, comprising generating a set of motion vector predictors for a block to decode of a current frame, the set of motion vector predictors being permitted to include at least one spatial motion vector predictor and no more than one temporal motion vector predictor, the generating comprising selecting as said temporal motion vector predictor the motion vector at a predetermined position in the vicinity of a bottom right position of an area of the reference frame collocated with said block to decode of the current frame, and in a block of the reference frame neighboring the collocated area; selecting a motion vector predictor from the generated set as a motion vector predictor for the block to decode based on information decoded from the bitstream; and determining a motion vector for the block to decode based on the selected motion vector predictor.

4. A method as claimed in claim 1, wherein at least one said spatial predictor is selected before the temporal predictor is determined, and the determination of the temporal predictor is carried out in dependence upon the selected spatial predictor(s).

5. A method as claimed in claim 1, wherein the determination of the temporal predictor is carried out in dependence of the availability of the selected spatial predictor(s).

6. A non-transitory computer readable carrier medium carrying a computer program which, when run on a computer or processor, causes the computer or processor to carry out a method according to any one of claims 1 or 3.

7. A method as claimed in claim 3, wherein at least one said spatial predictor is selected before the temporal predictor is determined, and the determination of the temporal predictor is carried out in dependence upon the selected spatial predictor(s).

8. A method as claimed in claim 3, wherein the determination of the temporal predictor is carried out in dependence of the availability of the selected spatial predictor(s).

9. A method as claimed in claim 3, wherein said block of the reference frame is diagonally below and to the right of said collocated area, and the predetermined position is a top left position in said block of the reference frame.

10. An apparatus for encoding a sequence of digital images into a bitstream, at least one block of an image being encoded by inter prediction with respect to a reference image block comprising a generator which generates a set of motion vector predictors for a block to encode of a current frame, the set of motion vector predictors being permitted to include at least one spatial motion vector predictor and no more than one temporal motion vector predictor, the generator comprising a spatial predictor selector which selects the at least one spatial motion vector predictor and a temporal predictor selector which selects as said temporal motion vector predictor the motion vector at a predetermined position in the vicinity of a bottom right position of an area of the reference frame collocated with said block to encode of the current frame, and in a block of the reference frame neighboring the collocated area; and further comprising a motion vector predictor selector which selects a motion vector predictor from the generated set as a motion vector predictor for the block to encode; and a motion vector predictor encoder that encodes in the bitstream information identifying the selected motion vector predictor.

11. An apparatus as claimed in claim 10, wherein the spatial predictor selector selects at least one said spatial predictor before the temporal predictor is determined, the temporal predictor selector being operable to determine the temporal predictor in dependence upon the selected spatial predictor(s).

12. An apparatus as claimed in claim 10, wherein the temporal predictor selector is operable to determine the temporal predictor in dependence upon the availability of the selected spatial predictor(s).

13. A method as claimed in claim 10, wherein said block of the reference frame is diagonally below and to the right of said collocated area, and the predetermined position is a top left position in said block of the reference frame.

14. An apparatus for decoding a bitstream comprising an encoded sequence of digital images, at least one block of an image being encoded by inter prediction with respect to a reference image block, comprising a generator which generates a set of motion vector predictors for a block to decode of a current frame, the set of motion vector predictors being permitted to include at least one spatial motion vector predictor and no more than one temporal motion vector predictor, the generator comprising a spatial predictor selector which selects the at least one spatial motion vector predictor and a temporal predictor selector which selects as said temporal motion vector predictor the motion vector at a predetermined position in the vicinity of a bottom right position of an area of the reference frame collocated with said block to decode of the current frame, and in a block of the reference frame neighboring the collocated area and further comprising a motion vector predictor selector which selects a motion vector predictor for the block to decode from the generated set based on information decoded from the bitstream; and a motion vector decoder which determines a motion vector for the block to decode based on the selected motion vector predictor.

15. An apparatus as claimed in claim 14, wherein the spatial predictor selector selects at least one said spatial predictor before the temporal predictor is determined, the temporal predictor selector being operable to determine the temporal predictor in dependence upon the selected spatial predictor(s).

16. An apparatus as claimed in claim 14, wherein the temporal predictor selector is operable to determine the temporal predictor in dependence upon the availability of the selected spatial predictor(s).

17. A method as claimed in claim 14, wherein said block of the reference frame is diagonally below and to the right of said collocated area, and the predetermined position is a top left position in said block of the reference frame.

* * * * *